(12) United States Patent
Takano et al.

(10) Patent No.: US 9,335,547 B2
(45) Date of Patent: May 10, 2016

(54) HEAD-MOUNTED DISPLAY DEVICE AND METHOD OF CONTROLLING HEAD-MOUNTED DISPLAY DEVICE

(71) Applicant: Seiko Epson Corporation, Tokyo (JP)

(72) Inventors: Masahide Takano, Matsumoto (JP); Fusashi Kimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 113 days.

(21) Appl. No.: 14/212,225

(22) Filed: Mar. 14, 2014

(65) Prior Publication Data

US 2014/0285404 A1 Sep. 25, 2014

(30) Foreign Application Priority Data

Mar. 25, 2013 (JP) ................................. 2013-061466
Mar. 26, 2013 (JP) ................................. 2013-063599
Oct. 30, 2013 (JP) ................................. 2013-225386

(51) Int. Cl.
| | |
|---|---|
| *G02B 27/01* | (2006.01) |
| *G06F 3/00* | (2006.01) |
| *G06F 3/01* | (2006.01) |
| *G06F 3/03* | (2006.01) |
| *G02B 27/00* | (2006.01) |
| *H04M 1/05* | (2006.01) |
| *H04M 1/725* | (2006.01) |

(52) U.S. Cl.
CPC .......... *G02B 27/017* (2013.01); *G02B 27/0093* (2013.01); *G06F 3/005* (2013.01); *G06F 3/012* (2013.01); *G06F 3/013* (2013.01); *G06F 3/017* (2013.01); *G06F 3/0304* (2013.01); *G02B 2027/014* (2013.01); *G02B 2027/0178* (2013.01); *G02B 2027/0187* (2013.01); *H04M 1/05* (2013.01); *H04M 1/72527* (2013.01)

(58) Field of Classification Search
CPC ......... G06F 3/011; G06F 3/012; G06F 3/013; G02B 27/01; G02B 27/017
See application file for complete search history.

(56) References Cited

U.S. PATENT DOCUMENTS

| | | |
|---|---|---|
| 6,637,883 B1 | 10/2003 | Tengshe et al. |
| 2002/0101568 A1 | 8/2002 | Eberl et al. |

(Continued)

FOREIGN PATENT DOCUMENTS

| | | |
|---|---|---|
| EP | 1914998 | 4/2008 |
| JP | 6-208158 A | 7/1904 |

(Continued)

OTHER PUBLICATIONS

Hisashi Yoshida, Tsuyoshi Kohama, "Detecting a change in mind = brain activity on the basis of eye movement," Jun. 9, 2011, http://www.waka.kindai.ac.jp/topics/20110609_3.html.

(Continued)

*Primary Examiner* — Carolyn R Edwards
(74) *Attorney, Agent, or Firm* — ALG Intellectual Property, LLC

(57) ABSTRACT

A transmissive head-mounted display device includes an image display unit that generates image light representing an image, allows a user to visually recognize the image light, and transmits outside scenery when worn on a head of a user, a detection unit that detects at least one of a line-of-sight direction of the user and a shielding object that is located at a predetermined distance from an eye of the user and shields a line of sight of the user, and a control unit that performs control of the image light based on the detected detection result.

22 Claims, 27 Drawing Sheets

(56) References Cited

U.S. PATENT DOCUMENTS

| | | | |
|---|---|---|---|
| 2009/0086165 A1 | 4/2009 | Beymer | |
| 2012/0206334 A1 | 8/2012 | Osterhout et al. | |
| 2012/0242570 A1 | 9/2012 | Kobayashi | |
| 2012/0294478 A1* | 11/2012 | Publicover | G06K 9/00604 382/103 |
| 2013/0304479 A1* | 11/2013 | Teller | G06F 3/013 704/275 |

FOREIGN PATENT DOCUMENTS

| | | |
|---|---|---|
| JP | 9-128138 | 5/1997 |
| JP | 9-204287 A | 8/1997 |
| JP | 2002-175025 A | 6/2002 |
| JP | 2002-318652 | 10/2002 |
| JP | 2003-91353 | 3/2003 |
| JP | 2003-255861 A | 9/2003 |
| JP | 2009-10987 | 1/2009 |
| JP | 2010-41643 A | 2/2010 |
| JP | 2010-152443 A | 7/2010 |
| JP | 2010218405 | 9/2010 |
| JP | 2013-110662 | 6/2013 |
| JP | 5272827 B2 | 8/2013 |
| WO | WO-2010-073879 | 7/2010 |
| WO | WO-2010-073879 A | 7/2010 |

OTHER PUBLICATIONS

Atsushi Watanabe, "Study of time-space-synthesized perception characteristics for presenting visual information," Mar. 24, 2004, University of Tokyo, http://www.junji.org.

European Search Report, Oct. 6, 2015, issued in related Patent Application No. EP-14161099.

European Search Report, Jan. 27, 2016, issued in related Patent Application No. EP-14161099.

* cited by examiner

| PROCESSING | RIGHT EYE | LEFT EYE |
|---|---|---|
| SHIFT TO IMAGING ADJUSTMENT MODE | OPENED | CLOSED |
| POINTER DISPLAY IN IMAGING ADJUSTMENT MODE | HALF-CLOSED | — |
| SHIFT FROM IMAGING ADJUSTMENT MODE TO IMAGING AREA FIXING MODE | CLOSED | — |
| END IMAGING PROCESSING AND SHIFT TO THUMBNAIL DISPLAY MODE | OPENED AND CLOSED TWICE IN PREDETER- MINED PERIOD | — |
| POINTER DISPLAY IN THUMBNAIL DISPLAY MODE | CLOSED | CLOSED |
| SHIFT TO SELECTED IMAGE ENLARGING MODE IN THUMBNAIL DISPLAY MODE | — | OPENED AND CLOSED TWICE IN PREDETER- MINED PERIOD |

FIG. 13

HEAD-MOUNTED DISPLAY DEVICE AND METHOD OF CONTROLLING HEAD-MOUNTED DISPLAY DEVICE

BACKGROUND

1. Technical Field

The present invention relates to a head-mounted display device.

2. Related Art

Head-mounted display devices (head-mounted displays, HMDs) as display devices worn on heads have been known. For example, the head-mounted display device generates image light representing an image using a liquid crystal display and a light source, guides the generated image light to an eye of a user using a projection system and a light guide plate, and thereby, allows the user to visually recognize a virtual image. There are two types of head-mounted display devices of a transmissive type that enables the user to visually recognize outside scenery in addition to the virtual image and a non-transmissive type that disables the user to visually recognize the outside scenery. The transmissive head-mounted display devices include an optical transmissive type and a video transmissive type. As input devices for operation of the head-mounted display device, for example, a keyboard, a mouse, a track pad, etc. have been known. On the other hand, a camera that detects a status of the eye of the user and images outside scenery by imaging based on the detected status of the eye has been known.

Patent Document 1 (JP-A-2010-152443) has disclosed a technology, in a head-mounted display device that allows one eye of a user to visually recognize an image of contents or the like, of imaging an eye movement of one eye and imaging an eyelid movement of the other eye, and controlling an image to be visually recognized by the user based on the imaged eye movement and eyelid movement. Further, Patent Document 2 (JP-A-2002-318652) has disclosed a technology, in a head-mounted display device, of allowing a user to visually recognize an image of a user interface such as a keyboard on a flat surface within the predetermined distance from the user and detecting input operation of the user for the user interface, and thereby, operating the head-mounted display device. Furthermore, Patent Document 3 (JP-A-2003-91353) has disclosed a technology of allowing a user to visually recognize a keyboard as an input device for a head-mounted display device and keys of the keyboard touched by the user as images.

Patent Document 4 (JP-A-2010-41643) has disclosed a technology, in a camera that detects a wink of an eye of a user and images outside scenery based on the detected wink, of selecting an imaging mode between a delay mode of imaging after a delay of a predetermined period from the detection of the wink and a non-delay mode of imaging with no delay. Further, Patent Document 5 (JP-A-6-208158) has disclosed a camera that suppresses camera shake at imaging by imaging outside scenery based on a detected wink of an eye of a user. Furthermore, Patent Document 6 (JP-A-2010-152443) has disclosed a technology, in a head-mounted display device that allows one eye of a user to visually recognize an image of contents or the like, of imaging an eye movement of one eye and imaging an eyelid movement of the other eye, and setting an image to be visually recognized by the user based on the imaged eye movement and eyelid movement.

Patent Document 7 (JP-A-9-128138) has disclosed a technology, in a head-mounted display device that allows a user to visually recognize an image of a pointer as an user interface, of detecting a position fixated by the user in a predetermined period or more, displaying a pointer in the detected position, and then, when the position fixated by the user changes and a track ball receiving operation of the user is clicked with the pointer displayed, moving and displaying the pointer to the changed position fixated by the user. Patent Document 8 (JP-A-9-204287) has disclosed a technology, on a display that displays a plurality of virtual windows, when a user fixates a part of a specific window, of displaying a message as to whether or not to activate the fixated window.

Hisashi Yoshida, Takashi Kohama, Menougokikara Kokoronohenka=Nounokatsudou wo Toraeru, [online], [searched on Oct. 17, 2013], Internet <http://www.waka.kindai.ac.jp/topics/20110609_3.html> is an example of related art.

Junji Watanabe, Shikakujouhouteijinotameno Jikuukantougouchikakutokusei no Kenkyu, Doctor Thesis, Graduate School of Information Science of Technology, The University of Tokyo, Information Physics and Computing, [online], [searched on Oct. 17, 2013], Internet <http://www.junji.org/papers/DoctorThesis.pdf> is an example of related art.

In the head-mounted display device disclosed in Patent Document 1, the image to be visually recognized by the user is controlled based on the eye movement of the user, however, an operation based on the eye movement of the user other than the control of the image in the head-mounted display device has been desired. In addition, an operation of the head-mounted display device not only based on the eye movement of one eye but also various movements including the eye movements of both eyes has been desired. Further, in the technology disclosed in Patent Document 2, when there is no flat surface within the predetermined distance from the user, it may be impossible for the user to visually recognize the image of the user interface, and there has been room for improvement in convenience. Furthermore, in the technology disclosed in Patent Document 3, the user can visually recognize the touched key on the keyboard as the input device, however, an operation of the head-mounted display device without the need of the input device such as the keyboard or the use of the user's hand has been desired. Note that the above described tasks are not only for the head-mounted display device, but common to display devices that enable the user to visually recognize the input devices.

Further, in the technologies disclosed in Patent Document 4 and Patent Document 5, the user should confirm the image to be imaged by seeing through a viewfinder when imaging the outside scenery, and there has been room for improvement in operability at imaging. In addition, the imaging function of the camera is controlled based on the eyelid status of the user's eye, however, control of the other functions than the imaging function based on the eyelid status has been desired. Furthermore, in the head-mounted display device disclosed in Patent Document 6, the image to be visually recognized is set based on the eye movement of the user's eye, however, the operation by the eye movement may be difficult and the simpler operation method has been desired.

Further, in the technology disclosed in Patent Document 7, the operation of moving the pointer by the user is performed by the position of the line of sight of the user, however, the operation of input etc. after moving the pointer is performed by other operations than the position of the line of sight, and the operation of input etc. by the position of the line of sight or the like has been desired. Furthermore, in the technology disclosed in Patent Document 8, the specific window is selected among the plurality of windows by fixation of the user, however, operations other than the selection of the window by the line of sight of the user have been desired.

SUMMARY

An advantage of some aspects of the invention is to solve at least a part of the problems described above, and the invention can be implemented as the following aspects.

(1) An aspect of the invention provides a transmissive head-mounted display device. The head-mounted display device includes an image display unit that generates image light representing an image, allows a user to visually recognize the image light, and transmits outside scenery when worn on a head of a user, a detection unit that detects at least one of a line-of-sight direction of the user and a shielding object that is located at a predetermined distance from an eye of the user and shields a line of sight of the user, and a control unit that performs control of the image light based on the detected detection result.

(2) In the head-mounted display device of the aspect of the invention described above, the image display unit may allow the user to visually recognize a plurality of selectable objects and a pointer indicating a position corresponding to the detected line-of-sight direction as the image light, and the control unit may perform control on the head-mounted display device in response to a positional relationship between the plurality of objects and the pointer. According to the head-mounted display device of this configuration, the user can perform various kinds of control of the head-mounted display device without using hands based on the line-of-sight direction of the user, and the operability of the user is improved. Further, the user can perform control of the head-mounted display device without a user interface including a keyboard having a form as an object, and the portability of the head-mounted display device is improved.

(3) In the head-mounted display device of the aspect of the invention described above, the detection unit may detect the shielding object in the line-of-sight direction, and the control unit may perform, as the control, selection of one of the objects based on the positional relationship, and perform determination of the selected object based on the detection result of the shielding object. According to the head-mounted display device of this configuration, the head-mounted display device is controlled based on the line-of-sight direction of the user and the shielding object existing in the line-of-sight direction, and thereby, the user can control the head-mounted display device completely without using hands and the operability of the user is improved.

(4) In the head-mounted display device of the aspect of the invention described above, the detection unit may detect an eyelid status of the user as the shielding object, and the control unit may perform control in response to the detected eyelid status and the positional relationship. According to the head-mounted display device of this configuration, the head-mounted display device is controlled based on the line-of-sight directions of the user and the opened and closed statuses of both eyelids, and thereby, the user can control the head-mounted display device completely without using hands and the operability of the user is improved.

(5) In the head-mounted display device of the aspect of the invention described above, the detection unit may detect an opened and closed status of a right eyelid and an opened and closed status of a left eyelid of the user, and the control unit may perform control in response to the positional relationship and the detected combination of the opened and closed status of the right eyelid and the opened and closed status of the left eyelid. According to the head-mounted display device of this configuration, the control of the head-mounted display device is performed based on the combination of the opened and closed statuses of both eyelids, and thereby, many combinations of decision corresponding to the kinds of operation may be provided to the user and the operability of the user is improved.

(6) In the head-mounted display device of the aspect of the invention described above, the detection unit may detect a right eye front index value and a left eye front index value indicating at least one of colors and illuminance in a range from the respective right eye and left eye of the user to the predetermined distance, and the control unit may perform control in response to the positional relationship and the detected right eye front index value and left eye front index value. According to the head-mounted display device of this configuration, the user can sensuously perform operation using a part of a body such as a palm when tired of the operation by the eyelid statuses, and the convenience of the user is improved.

(7) In the head-mounted display device of the aspect of the invention described above, the image display unit may set an area that generates the image light based on the detected line-of-sight direction and the detection result of the shielding object. According to the head-mounted display device of this configuration, the user can set the position in which the image light is generated according to the intension of the user without using hands or the like, and thereby, the operability and the convenience of the user are improved.

(8) In the head-mounted display device of the aspect of the invention described above, an imaging unit that images the outside scenery, and an image recognition unit that recognizes a specific object contained in the imaged outside scenery and existing in a position father than the predetermined distance are further provided, and the image display unit may set an area that generates the image light based on the recognized specific object. According to the head-mounted display device of this configuration, the area in which the image light is generated is set based on the specific object recognized by the image recognition unit, and thereby, the user can sensuously set the size of the image light and the convenience of the user is improved. Further, regarding generation or not of image light, the user can only place the specific object at the predetermined distance, and the convenience of the user is improved.

(9) In the head-mounted display device of the aspect of the invention described above, the head-mounted display device may further include an orientation detection unit that detects an orientation of the head of the user, and the image display unit may set an area that generates the image light based on the detected orientation of the head. According to the head-mounted display device of this configuration, the user changes the orientation of the head and the change of the object desired to be visually recognized by the user is detected, the image light is automatically generated in a position not hindering the visual range of the user, and thereby, the convenience of the user is improved.

(10) In the head-mounted display device of the aspect of the invention described above, the head-mounted display device may further includes an imaging unit that images the outside scenery, and the control unit may perform operation of the imaging unit based on the detection result of the shielding object as the control, and the image display unit may generate area image light as image light representing an imaging area. According to the head-mounted display device of this configuration, the user images the outside scenery while visually recognizing it, and thereby, the area image light representing at least a partial area of the imaged outside scenery is visually recognized. Therefore, the user can image the outside scenery while visually recognizing it without especially seeing through a viewfinder or the like, imaging may be easily timed, and the convenience of the user is improved. Further, the user can image the outside scenery without touching the imaging unit, and may perform imaging with suppressed camera shake.

(11) In the head-mounted display device of the aspect of the invention described above, the detection unit may detect an eyelid status of the user as the shielding object, and the control unit may perform the operation based on the detected eyelid status. According to the head-mounted display device of the aspect, the user can image the outside scenery using the imaging unit without using hands, and the convenience of the user is improved.

(12) In the head-mounted display device of the aspect of the invention described above, the detection unit may detect an opened and closed status of a right eyelid and an opened and closed status of a left eyelid of the user, and the control unit may perform the operation based on the detected combination of the opened and closed status of the right eyelid and the opened and closed status of the left eyelid. According to the head-mounted display device of this configuration, the user can image the outside scenery using the imaging unit without using hands, and the convenience of the user is improved.

(13) In the head-mounted display device of the aspect of the invention described above, the image display unit may generate line-of-sight position image light as image light representing a position corresponding to the line-of-sight direction with respect to the imaged outside scenery and allow the user to visually recognize the line-of-sight position image light, the control unit may set a partial area of the imaged outside scenery based on the detected line-of-sight direction and the combination, and the area image light may be image light representing the set partial area. According to the head-mounted display device of this configuration, the user can set a partial area imaged by the imaging unit and allow the user to visually recognize the area image light representing an image of the set partial area without using hands, and the usability, the convenience, and the operability of the user are improved.

(14) In the head-mounted display device of the aspect of the invention described above, the operation may include adjustment of a focal length of a lens of the imaging unit, and, regarding the area image light, when the focal length is within the predetermined distance, the area image light may be generated in a peripheral part in the partial area, and, when the focal length is beyond the predetermined distance, outside scenery image light representing an outside scenery image in the partial area may be generated as the area image light. According to the head-mounted display device of this configuration, the user can set the focal length of the imaging unit without using hands, and thereby, the convenience of the user is improved. Further, when the set focal length is a focal length for providing outside scenery like the visually recognized outside scenery, the area image light is image light representing the partial area. Furthermore, when the set focal length is a focal length for providing outside scenery different from the visually recognized outside scenery, the area image light is outside scenery image light representing the outside scenery image of the partial area. Therefore, the image display unit generates the image light in response to the comparison between the outside scenery visually recognized by the user and the area image light, and the visibility and the operability of the user are improved.

(15) In the head-mounted display device of the aspect of the invention described above, the detection unit may detect a right eye front index value and a left eye front index value indicating at least one of colors and illuminance in a range from the respective right eye and left eye of the user to the predetermined distance, and the control unit may perform the operation based on the detected right eye front index value and the left eye front index value. According to the head-mounted display device of this configuration, when the user is tired of the operation by changing the eyelid statuses such as winking, the user can sensuously perform the operation like changing of the eyelid statuses using a part of the body such as a hand, and thereby, the convenience of the user is improved.

(16) In the head-mounted display device of the aspect of the invention described above, the head-mounted display device may further include an image recognition unit that recognizes a specific object contained in the imaged outside scenery based on the operation, and, when the specific object is recognized in the imaged outside scenery, the control unit may set a partial area of the imaged outside scenery based on the detected specific object, and the outside scenery image light may be image light representing the set partial area. According to the head-mounted display device of this configuration, even when the specific object is not contained in the imaged outside scenery, the position of the specific object is automatically estimated and the specific object is imaged, and thereby, the convenience of the user is improved.

(17) In the head-mounted display device of the aspect of the invention described above, when the specific object is not recognized in the imaged outside scenery, the control unit may estimate a direction from the imaging unit to the specific object based on change in position of the specific object when the specific object is recognized in the imaged outside scenery, and the imaging unit may image the estimated direction. According to the head-mounted display device of the aspect, unless a transmitter or the like is mounted on the specific object, the specific object is image-recognized and the specific object is automatically tracked and imaged, and thereby, the usability and the operability of the user are improved. Further, the image light representing the outside scenery containing the specific object different from the outside scenery visually recognized by the user is visually recognized by the user, and thereby, it is not necessary for the user to visually recognize the specific object when imaging the specific object and the convenience of the user is improved.

(18) In the head-mounted display device of the aspect of the invention described above, the head-mounted display device may further include an orientation detection unit that detects an orientation of the head of the user with respect to the direction of gravity force, and, when an angle formed by the detected orientation of the head and the direction of gravity force is equal to or more than a predetermined value, the image display unit may generate the area image light as image light representing an entire or a partial area of outside scenery imaged with an axis in parallel to the horizontal plane orthogonal to the direction of gravity force as an optical axis based on the angle. According to the head-mounted display device of this configuration, even when the orientation of the head of the user is temporarily changed, the imaging unit images the outside scenery with the axis in parallel to the horizontal plane as the optical axis, and thereby, the usability of the user is improved.

(19) In the head-mounted display device of the aspect of the invention described above, the detection unit may detect fluctuations in line of sight when the user fixates a specific point, and the control unit may perform the control based on the fluctuations in line of sight. According to the head-mounted display device of this configuration, the control of the image light is performed based on the line-of-sight direction in consideration of the fluctuations in line of sight of the user, and the accuracy of the control may be improved.

(20) In the head-mounted display device of the aspect of the invention described above, when an amplitude of the fluctuations in line of sight is less than a threshold value, the control unit may determine that the user fixates the specific point. According to the head-mounted display device of this configuration, whether or not the user fixates the specific point may be simply performed by setting the amplitude.

(21) In the head-mounted display device of the aspect of the invention described above, when the line-of-sight direction falls within a predetermined range around the specific point in a predetermined period, the control unit may determine that the user fixates the specific point. According to the head-mounted display device of this configuration, whether or not the user fixates the specific point may be simply performed by setting the predetermined range.

(22) In the head-mounted display device of the aspect of the invention described above, the image display unit may allow a user to visually recognize image light representing the predetermined range as the image light. According to the head-mounted display device of this configuration, the user can visually recognize the degree as to whether or not the user fixates the specific point by the image light representing the predetermined range, and the convenience of the user is improved.

(23) In the head-mounted display device of the aspect of the invention described above, the head-mounted display device may further include a sound output unit, and, when the line-of-sight direction falls within the predetermined range in the predetermined period, the control unit may allow the sound output unit to output specific sound. According to the head-mounted display device of this configuration, the user can recognize that the user can control the image light by sound, and the convenience of the user is improved.

(24) In the head-mounted display device of the aspect of the invention described above, the image display unit may allow the user to visually recognize a plurality of selectable objects and a pointer indicating a position corresponding to the detected line-of-sight direction as the image light, and, when determining that the user fixates the specific point, the control unit may set the object to be selectable. According to the head-mounted display device of this configuration, erroneous operation of selecting a selectable object unless the user does not fixate the object in the image light may be prevented and accurate operation reflecting the intention of the user is performed.

Not all of the plurality of component elements of the above described respective aspects of the invention are essential. In order to solve part or all of the above described problems or in order to achieve part or all of the advantages described in the specification, some component elements of the plurality of the component elements may be appropriately changed, deleted, replaced by new other component elements, partially deleted in limitations. Further, in order to solve part or all of the above described problems or in order to achieve part or all of the advantages described in the specification, part or all of the technological features contained in above described one aspect of the invention may be combined with part or all of the technological features contained in above described the other aspects of the invention into one independent aspect of the invention.

For example, one aspect of the invention may be implemented as a device including one, more, or all of the three elements of the image display unit, the detection unit, and the control unit. That is, the device may have the image display unit or not. Further, the device may have the detection unit or not. Furthermore, the device may have the control unit or not. The image display unit may generate image light representing an image, allows a user to visually recognize the image light, and transmits outside scenery when worn on a head of a user, for example. The detection unit may detect at least one of a line-of-sight direction of the user and a shielding object that is located at a predetermined distance from an eye of the user and shields the line-of-sight direction of the user, for example. The control unit may perform control of the image light based on the detected detection result, for example. The device may be implemented as a head-mounted display device, and may be implemented as other devices than the head-mounted display device. According to the aspect, at least one of various challenges including improvement and simplification in operability of the device, integration of the device, improvement in convenience of the user using the device may be resolved. Any of part or all of the technological features of the above described respective aspects of the head-mounted display device may be applied to the device.

The invention may be implemented in other various aspects than the head-mounted display device. For example, the invention may be implemented in forms of a display device, a method of controlling the head-mounted display device and the display device, a head-mounted display system, a display device, a computer program for implementation of functions of the head-mounted display system, and the display device, a recording medium recording the computer program, data signals embodied within carrier wave containing the computer program, etc.

BRIEF DESCRIPTION OF THE DRAWINGS

The invention will be described with reference to the accompanying drawings, wherein like numbers reference like elements.

FIG. 13 is an explanatory diagram showing examples of processing assigned to opened and closed statuses of the eyelids in the imaged image display processing.

DESCRIPTION OF EXEMPLARY EMBODIMENTS

Figure 1:
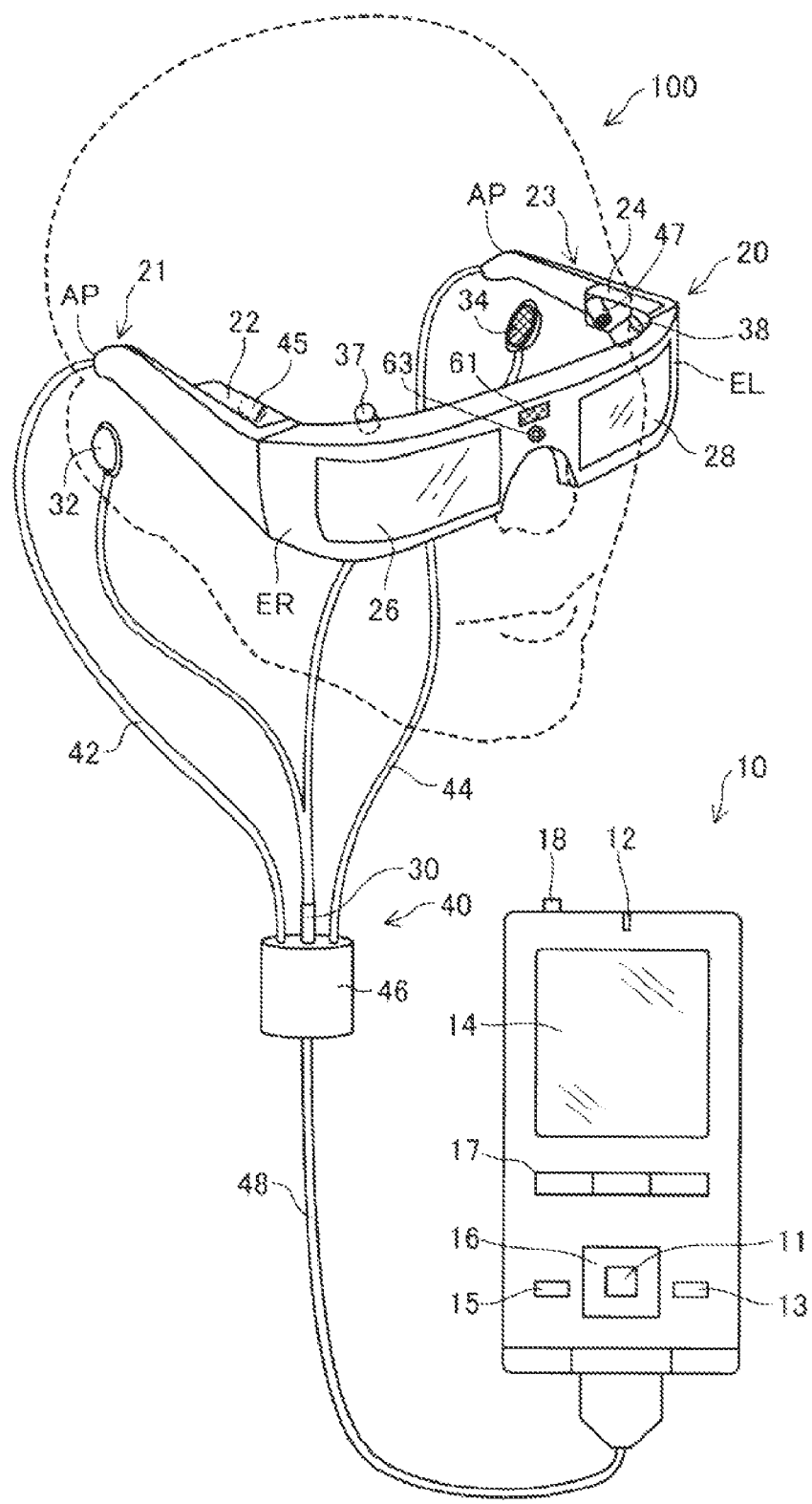
FIG. 1 is an explanatory diagram showing an outer configuration of a head-mounted display device.

Next, embodiments of the invention will be explained in the following order.
A. First Embodiment:
A-1. Configuration of Head-Mounted Display Device:
A-2. Line-of-Sight Operation Input Processing
B. Second Embodiment:
C. Third Embodiment:
D. Modified Examples:
A. First Embodiment:
A-1. Configuration of Head-Mounted Display Device:

FIG. 1 is an explanatory diagram showing an outer configuration of a head-mounted display device 100. The head-mounted display device 100 is a display device worn on a head and also called a head-mounted display (HMD). The head-mounted display device 100 of the embodiment is an optically-transmissive head-mounted display device that enables visual recognition of a virtual image and direct visual recognition of outside scenery. Note that, in the specification, the virtual image visually recognized by the user using the head-mounted display device 100 is also referred to as "displayed image" for convenience. Further, output of image light generated based on image data is also referred to as "display of an image".

The head-mounted display device 100 includes an image display unit 20 that is worn on a head of a user and allows the user to visually recognize a virtual image, and a control unit 10 (controller 10) that controls the image display unit 20.

The image display unit 20 is a wearable unit worn on the head of the user and has a spectacle shape in the embodiment. The image display unit 20 includes a right holding part 21, a right display drive part 22, a left holding part 23, a left display drive part 24, aright optical image display part 26, a left optical image display part 28, an outside scenery imaging camera 61, a range sensor 63, a right-eye imaging camera 37, a left-eye imaging camera 38, a right-eye illuminance sensor 45, and a left-eye illuminance sensor 47. The right optical image display part 26 and the left optical image display part 28 are provided to be located in front of the right and left eyes when the user wears the image display unit 20, respectively. One end of the right optical image display part 26 and one end of the left optical image display part 28 are connected to each other in a position corresponding to the glabella of the user when the user wears the image display unit 20.

The right holding part 21 is a member provided to extend from an end part ER as the other end of the right optical image display part 26 to the position corresponding to the temporal part of the user when the user wears the image display unit 20. Similarly, the left holding part 23 is a member provided to extend from an end part EL as the other end of the left optical image display part 28 to the position corresponding to the temporal part of the user when the user wears the image display unit 20. The right holding part 21 and the left holding part 23 hold the image display unit 20 on the head of the user like temples of spectacles.

The right display drive part 22 and the left display drive part 24 are provided at the sides opposed to the head of the user when the user wears the image display unit 20. Note that, as below, the right holding part 21 and the left holding part 23 are also collectively and simply referred to as "holding parts", the right display drive part 22 and the left display drive part 24 are also collectively and simply referred to as "display drive parts", and the right optical image display part 26 and the left optical image display part 28 are also collectively and simply referred to as "optical image display parts".

The display drive parts 22, 24 include liquid crystal displays 241, 242 (hereinafter, referred to as "LCDs 241, 242"), and projection systems 251, 252, and the like (see FIG. 3). The details of the configurations of the display drive parts 22, 24 will be described later. The optical image display parts 26, 28 as optical members include light guide plates 261, 262 (see FIG. 2) and a dimming plate. The light guide plates 261, 262 are formed using a light-transmissive resin material or the like and guide image lights output from the display drive parts 22, 24 to the eyes of the user. The dimming plate is an optical device having a thin plate shape and provided to cover the front side of the image display unit 20 as the opposite side to the side of the user's eyes. The dimming plate protects the light guide plates 261, 262 and suppresses damage, attachment of dirt, or the like to the light guide plates 261, 262. Further, by adjustment of light transmittance of the dimming plate, the amount of outside light entering the user's eyes may be adjusted and the ease of visual recognition of the virtual image may be adjusted. Note that the dimming plate is dispensable.

The outside scenery imaging camera 61 is provided in the position corresponding to the glabella of the user when the user wears the image display unit 20. The outside scenery imaging camera 61 images outside scenery as scenery of the outside and acquires an outside scenery image. The outside scenery imaging camera 61 in the embodiment is a monocular camera, or may be a stereo camera. The outside scenery imaging camera 61 corresponds to an imaging unit in the appended claims.

The range sensor 63 is provided in the position corresponding to the glabella of the user when the user wears the image display unit 20. The range sensor 63 is an infrared range sensor that emits an infrared ray and receives the infrared ray reflected by an object, and measures a distance between the range sensor 63 and the object based on the receiving position of the reflected light. The range sensor 63 used in the embodiment measures the distance between the range sensor 63 in a specific position and the object, and thereby, detects the object at a predetermined distance from the range sensor 63. In another embodiment, the range sensor 63 may be an infrared range sensor having a plurality of light emitting parts and measuring the size and the position of the object. Further, the range sensor 63 may be an optical sensor or an ultrasonic sensor, not the infrared sensor. The range sensor 63 corresponds to an image recognition unit in the appended claims.

The right-eye imaging camera 37 and the left-eye imaging camera 38 (hereinafter, also referred to as "eye imaging cameras 37, 38") are small CCD cameras that image the right eye and the left eye of the user, respectively. The right-eye illuminance sensor 45 and the left-eye illuminance sensor 47 (hereinafter, also referred to as "illuminance sensors 45, 47") are sensors that detect illuminance of the outside scenery visually recognized by the right eye and the left eye of the user, respectively. Note that the eye imaging cameras 37, 38 correspond to a detection unit in the appended claims. Further, the illuminance sensors 45, 47 correspond to the detection unit in the appended claims, and the illuminance detected by the right-eye illuminance sensor 45 and the illuminance detected by the left-eye illuminance sensor 47 correspond to a right eye front index value and a left eye front index value in the appended claims, respectively.

The image display unit 20 further has a connection unit 40 for connecting the image display unit 20 to the control unit 10. The connection unit 40 includes a main body cord 48 connected to the control unit 10, a right cord 42, a left cord 44, and a coupling member 46. The right cord 42 and the left cord 44 are cords formed by branching the main body cord 48 into two. The right cord 42 is inserted into a casing of the right holding part 21 from an end part AP in the extension direction of the right holding part 21 and connected to the right display drive part 22. Similarly, the left cord 44 is inserted into a casing of the left holding part 23 from an end part AP in the extension direction of the left holding part 23 and connected to the left display drive part 24. The coupling member 46 is provided at the branched point of the main body cord 48 and the right cord 42 and the left cord 44, and has a jack for connection of an earphone plug 30. From the earphone plug 30, a right earphone 32 and a left earphone 34 extend.

The image display unit 20 and the control unit 10 perform transmission of various signals via the connection unit 40. Connectors (not shown) fitted in each other are respectively provided in the end part in the main body cord 48 opposite to the coupling member 46 and the control unit 10. By fit/unfit of the connector of the main body cord 48 and the connector of the control unit 10, the control unit 10 and the image display unit 20 are connected or disconnected. For example, metal cables and optical fibers may be employed for the right cord 42, the left cord 44, and the main body cord 48.

The control unit 10 is a device for controlling the head-mounted display device 100. The control unit 10 includes an enter key 11, a lighting part 12, a display change key 13, a track pad 14, a brightness change key 15, an arrow key 16, a menu key 17, and a power switch 18. The enter key 11 detects press operation and outputs a signal for deciding the contents operated in the control unit 10. The lighting part 12 notifies the user of the operation status of the head-mounted display device 100 by its emission state. The operation status of the head-mounted display device 100 includes ON/OFF of power, for example. As the lighting part 12, for example, an LED (Light Emitting Diode) is used. The display change key 13 detects press operation and outputs a signal for switching the display mode of content moving images between 3D and 2D, for example. The track pad 14 detects the operation of the user's finger on the operation surface of the track pad 14 and outputs a signal in response to the detected operation. As the track pad 14, various track pads of electrostatic type, pressure detection type, and optical type may be employed. The brightness change key 15 detects the press operation and outputs a signal for increasing and decreasing the brightness of the image display unit 20. The arrow key 16 detects the press operation for the key corresponding to up, down, right and left and outputs a signal in response to the detected contents. The power switch 18 detects the slide operation of the switch, and thereby, switches the power-on state of the head-mounted display device 100.

Figure 2:
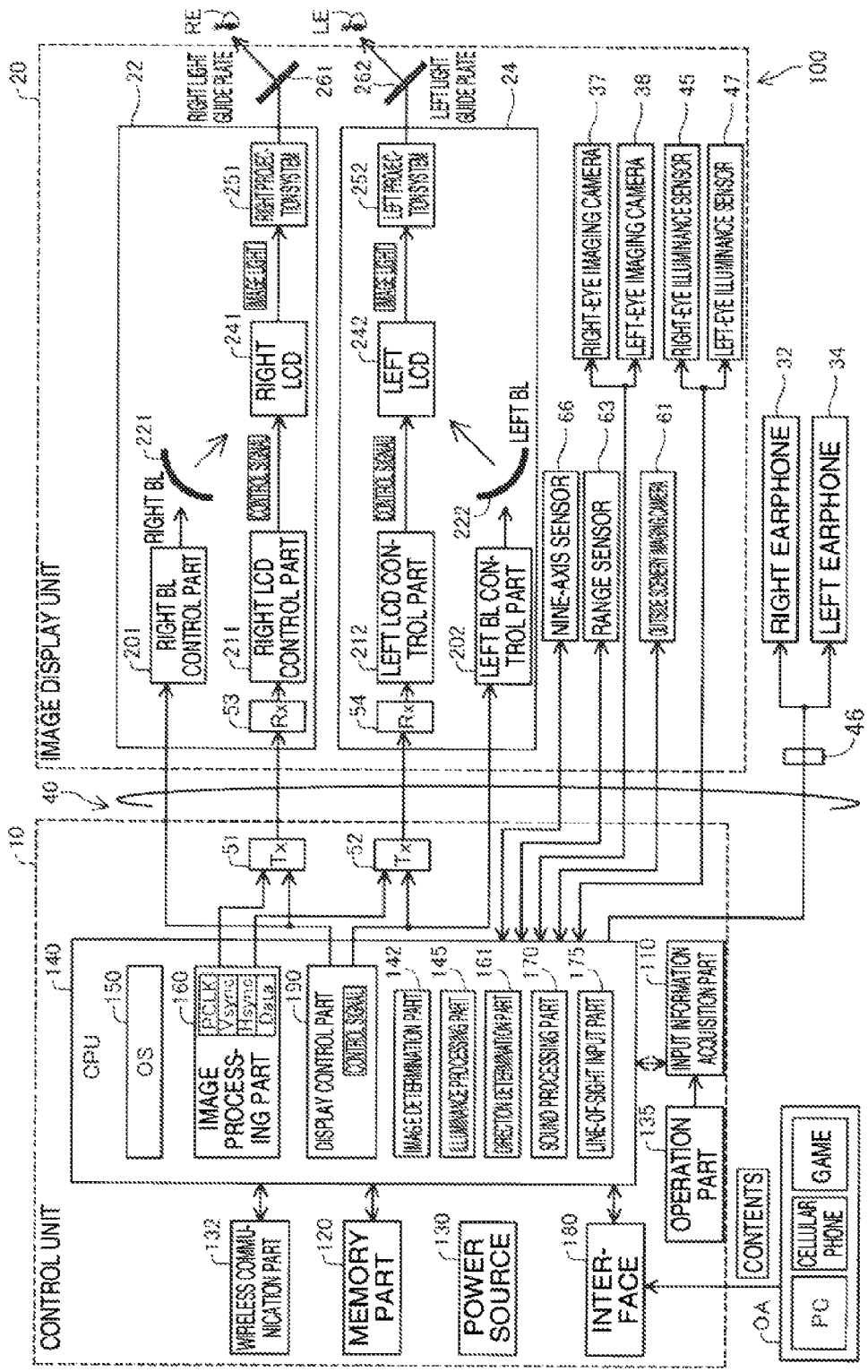
FIG. 2 is a block diagram functionally showing a configuration of the head-mounted display device.

FIG. 2 is a block diagram functionally showing a configuration of the head-mounted display device 100. As shown in FIG. 2, the control unit 10 has an input information acquisition part 110, a memory part 120, a power source 130, a wireless communication part 132, and an operation part 135, a CPU 140, an interface 180, a transmission part 51 (Tx 51), and a transmission part 52 (Tx 52). The operation part 135 receives operations by the user and includes the enter key 11, the display change key 13, the track pad 14, the brightness change key 15, the arrow key 16, the menu key 17, and the power switch 18.

The input information acquisition part 110 acquires a signal in response to the operation input by the user. The signal in response to the operation input includes, for example, signals for operation input to the track pad 14, the arrow key 16, and the power switch 18 provided in the operation part 135. The power source 130 supplies power to the respective units of the head-mounted display device 100. As the power source 130, for example, a secondary cell may be used. The memory part 120 stores various computer programs. The memory part 120 includes a ROM, a RAM, or the like. The wireless communication part 132 performs wireless communication with another device such as a contents server, a television, or a personal computer, for example, according to the predetermined wireless communications standard including wireless LAN and Bluetooth. The CPU 140 loads and executes the computer programs stored in the memory part 120, and thereby, functions as an operating system 150 (OS 150), a display control part 190, a sound processing part 170, a direction determination part 161, an illuminance processing part 145, an image determination part 142, a line-of-sight input part 175, and an image processing part 160.

The display control part 190 generates control signals for controlling the right display drive part 22 and the left display drive part 24. Specifically, the display control part 190 individually controls drive ON/OFF of the right LCD 241 by a right LCD control part 211, drive ON/OFF of a right backlight 221 by a right backlight control part 201, drive ON/OFF of the left LCD 242 by a left LCD control part 212, drive ON/OFF of a left backlight 222 by a left backlight control part 202, etc. with the control signals. Thereby, the display control part 190 controls the respective generation and output of image lights by the right display drive part 22 and the left display drive part 24. For example, the display control part 190 may allow both the right display drive part 22 and the left display drive part 24 to generate image lights, allow only one of the parts to generate image light, or allow both the right display drive part 22 and the left display drive part 24 not to generate image lights.

The display control part 190 transmits the respective control signals for the right LCD control part 211 and the left LCD control part 212 via the transmission parts 51 and 52. Further, the display control part 190 transmits the respective control signals for the right backlight control part 201 and the left backlight control part 202.

The direction determination part 161 calculates angles formed by an inclination of the head of the user estimated based on the orientation of the image display unit 20 detected by a nine-axis sensor 66, which will be described later, and the direction of gravitational force and the horizontal surface orthogonal to the direction of gravitational force. Note that the direction determination part 161 and the nine-axis sensor 66 correspond to an orientation detection unit in the appended claims.

The illuminance processing part 145 performs various calculations with respect to the illuminance of the outside scenery visually recognized by the right eye and the left eye of the user detected by the respective illuminance sensors 45, 47. The illuminance processing part 145 in the embodiment calculates a difference between the illuminance of the outside scenery of the right eye and the illuminance of the outside scenery of the left eye and change in illuminance detected in a fixed period. The illuminance processing part 145 determines whether or not the calculated illuminance difference and the illuminance difference before and after the change in illuminance are equal to or more than a preset threshold value. For example, in the case where the user covers only one of the right optical image display part 26 and the left optical image display part 28 with his or her hand under the sun, the illuminance processing part 145 determines that there is a difference between the illuminance of the outside scenery of the right eye and the illuminance of the outside scenery of the left eye equal to or more than the threshold value. Note that the illuminance processing part 145 corresponds to the detection unit in the appended claims.

The image determination part 142 analyzes images of the right eye and the left eye of the user imaged by the respective eye imaging cameras 37, 38, and thereby, the degrees of opened and closed statuses of the eyelids in the right eye and the left eye and detects the line-of-sight direction. The image determination part 142 performs pattern matching of the opened and closed statuses of the eyelids with respect to the right eye and the left eye of the user imaged by the eye imaging cameras 37, 38, and thereby, determines the closed status of the eyelid, the half-closed status of the eyelid, or the like. Further, the image determination part 142 performs pattern matching as to whether or not an object detected by the range sensor 63 is the same as a set object registered in advance. Note that the image determination part 142 corresponds to the detection unit and the image recognition unit in the appended claims.

The line-of-sight input part 175 allows the image display unit 20 to display a control image for receiving input from the user based on the difference of the illuminance and the change in illuminance calculated by the illuminance processing part 145, the opened and closed statuses of the eyelids determined by the image determination part 142, or the like. The control image displayed on the image display unit 20 includes a plurality of selectable buttons and position images representing the positions corresponding to the detected line-of-sight directions. The line-of-sight input part 175 controls the head-mounted display device 100 and various devices connected to the head-mounted display device 100 based on the opened and closed statuses of the eyelids, the line-of-sight direction, etc. Note that the devices connected to the head-mounted display device 100 are not limited to devices directly connected via cords or the like, but include devices communicated via the wireless communication part 132. The line-of-sight input part 175 corresponds to a control unit in the appended claims.

The image processing part 160 acquires image signals contained in contents. The image processing part 160 separates synchronizing signals including a vertical synchronizing signal VSync and a horizontal synchronizing signal HSync from the acquired image signals. Further, the image processing part 160 generates clock signals PCLK using a PLL (Phase Locked Loop) circuit or the like (not shown) in response to the periods of the separated vertical synchronizing signal VSync and horizontal synchronizing signal HSync. The image processing part 160 converts the analog image signals from which the synchronizing signals have been separated into digital image signals using an A/D converter circuit or the like (not shown). Then, the image processing part 160 stores the converted digital image signals as image data Data (RGB data) of an object image in a DRAM within the memory part 120 with respect to each frame. Note that the image processing part 160 may execute image processing such as resolution conversion processing, various kinds of tone correction processing including adjustment of brightness and saturation, keystone correction processing, or the like on the image data as necessary.

The image processing part 160 transmits the respective generated clock signals PCLK, vertical synchronizing signal VSync, horizontal synchronizing signal HSync, and the image data Data stored in the DRAM within the memory part 120 via the transmission parts 51, 52. Note that the image data Data transmitted via the transmission part 51 is also referred to as "right eye image data" and the image data Data transmitted via the transmission part 52 is also referred to as "left eye image data". The transmission parts 51, 52 function as transceivers for serial transmission between the control unit 10 and the image display unit 20.

The sound processing part 170 acquires sound signals contained in the contents, amplifies the acquired sound signals, and supplies the signals to a speaker (not shown) within the right earphone 32 and a speaker (not shown) within the left earphone 34 connected to the coupling member 46. Note that, for example, in the case where the Dolby (registered trademark) system is employed, processing on the sound signals is performed and different sounds at the varied frequencies or the like are output from the respective right earphone 32 and left earphone 34.

The interface 180 is an interface for connecting various external devices OA as supply sources of contents to the control unit 10. The external devices OA include a personal computer (PC), a cellular phone terminal, a game terminal, etc., for example. As the interface 180, for example, a USB interface, a micro USB interface, an interface for memory card, or the like may be used.

The image display unit 20 includes the right display drive part 22, the left display drive part 24, the right light guide plate 261 as the right optical image display part 26, the left light guide plate 262 as the left optical image display part 28, the outside scenery imaging camera 61, the range sensor 63, the nine-axis sensor 66, the right-eye imaging camera 37, the left-eye imaging camera 38, the right-eye illuminance sensor 45, and the left-eye illuminance sensor 47.

The nine-axis sensor 66 is a motion sensor that detects acceleration (three axes), angular velocities (three axes), and terrestrial magnetism (three axes). The nine-axis sensor 66 is provided in the image display unit 20, and thus, when the image display unit 20 is worn on the head of the user, detects the motion of the head of the user. The orientation of the image display unit 20 is specified from the detected motion of the head of the user, and the direction determination part 161 estimates the orientation of the head of the user.

The right display drive part 22 includes a reception part 53 (Rx 53), the right backlight control part 201 (right BL control part 201) and the right backlight 221 (right BL221) that function as a light source, the right LCD control part 211 and the right LCD 241 that function as a display device, and the right projection system 251. The right backlight control part 201 and the right backlight 221 function as the light source. The right LCD control part 211 and the right LCD 241 function as the display device. Note that the right backlight control part 201, the right LCD control part 211, the right backlight 221, and the right LCD 241 are also collectively referred to as "image light generation unit".

The reception part 53 functions as a receiver for serial transmission between the control unit 10 and the image display unit 20. The right backlight control part 201 drives the right backlight 221 based on the input control signal. The right backlight 221 is a light emitter such as an LED or electroluminescence (EL), for example. The right LCD control part 211 drives the right LCD 241 based on the clock signal PCLK, the vertical synchronizing signal VSync, the horizontal synchronizing signal HSync, and the right-eye image data input via the reception part 53. The right LCD 241 is a transmissive liquid crystal panel in which a plurality of pixels are arranged in a matrix.

The right projection system 251 includes a collimator lens that brings the image light output from the right LCD 241 into parallelized luminous fluxes. The right light guide plate 261 as the right optical image display part 26 guides the image light output from the right projection system 251 to the right eye RE of the user while reflecting the light along a predetermined optical path. Note that the right projection system 251 and the right light guide plate 261 are also collectively referred to as "light guide part".

The left display drive part 24 has the similar configuration as that of the right display drive part 22. The left display drive part 24 includes a reception part 54 (Rx 54), the left backlight control part 202 (left BL control part 202) and the left backlight 222 (left BL 222) that function as a light source, the left LCD control part 212 and the left LCD 242 that function as a display device, and the left projection system 252. The left backlight control part 202 and the left backlight 222 function as the light source. The left LCD control part 212 and the left LCD 242 function as the display device. Note that the left backlight control part 202, the left LCD control part 212, the left backlight 222, and the left LCD 242 are also collectively referred to as "image light generation part". Further, the left projection system 252 includes a collimator lens that brings the image light output from the left LCD 242 into parallelized luminous fluxes. The left light guide plate 262 as the left optical image display part 28 guides the image light output from the left projection system 252 to the left eye LE of the user while reflecting the light along a predetermined optical path. Note that the left projection system 252 and the left light guide plate 262 are also collectively referred to as "light guide part".

Figure 3:
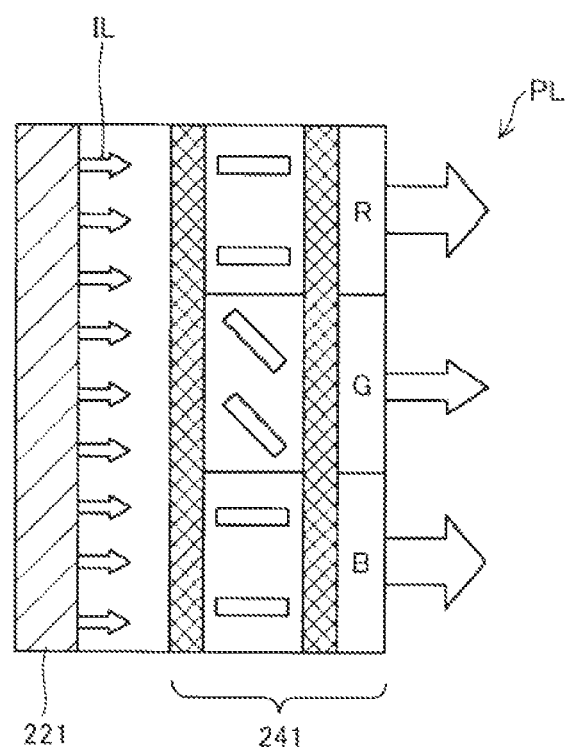
FIG. 3 is an explanatory diagram showing image lights output by an image light generation part.

FIG. 3 is an explanatory diagram showing image lights output by the image light generation part. The right LCD 241 drives the liquid crystal in the respective pixel positions arranged in the matrix to change the transmittance of the light to be transmitted through the right LCD 241, and thereby, modulates illumination light IL radiated from the right backlight 221 into effective image light PL representing an image. This applies to the left side. Note that the backlight system is employed in the embodiment as shown in FIG. 3, however, a configuration that outputs image light using the front light system and the reflection system may be employed.

A-2. Line-of-Sight Operation Input Processing

Figure 4:
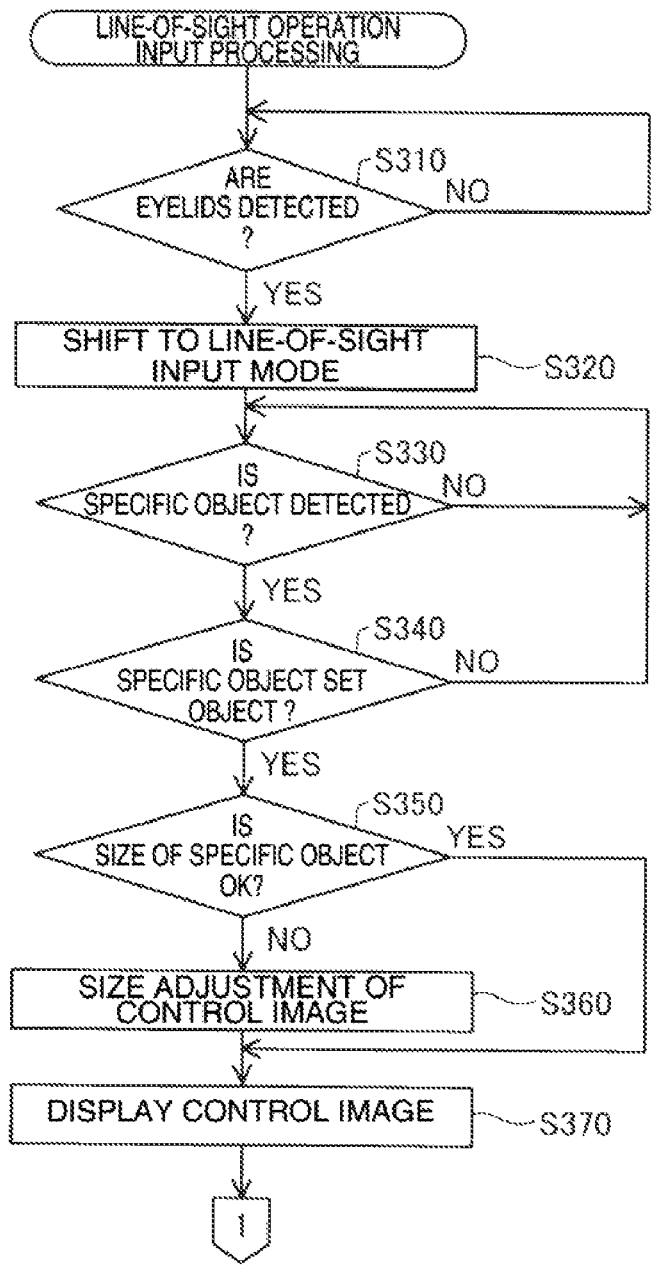
FIG. 4 is an explanatory diagram showing a flow of line-of-sight operation input processing.
Figure 5:
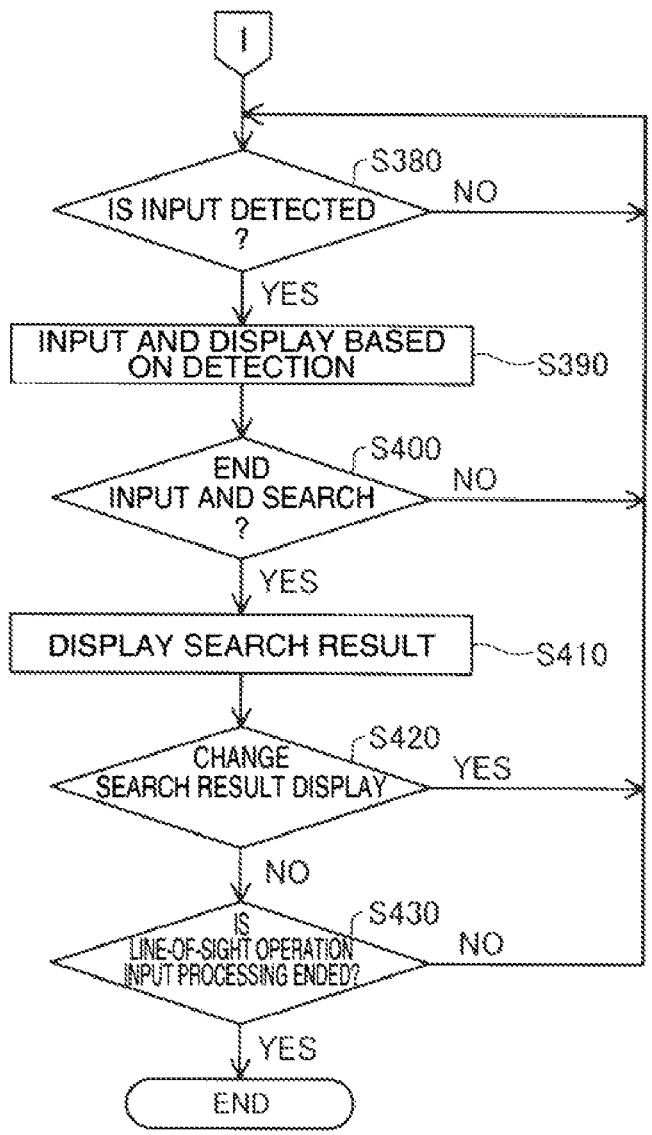
FIG. 5 is an explanatory diagram showing a flow of the line-of-sight operation input processing.

FIGS. 4 and 5 are explanatory diagrams showing a flow of line-of-sight operation input processing. In the line-of-sight operation input processing, the predetermined eyelid statuses of the user are detected, the display mode of the image display unit 20 shifts to the line-of-sight input mode, and the user may perform control of the head-mounted display device 100 or the like based on the opened and closed statuses of the eyelids without using hands. First, the eye imaging cameras 37, 38 monitor whether or not predetermined eyelid statuses of the user are detected in a predetermined period (step S310). In the embodiment, the predetermined eyelid statuses are a combination of the status in which the right eye as a dominant eye of the user is opened and the status in which the eyelid of the left eye not the dominant eye is closed. Note that, generally, the dominant eye visually recognizes the outside scenery more easily than the other eye not the dominant eye, and the eyelid of the other eye not the dominant eye is closed more easily than that of the dominant eye. Accordingly, in the embodiment, the predetermined combination of the eyelid statuses has good usability for the user. The dominant eye and the other eye not the dominant eye may be preset by the user or, in another embodiment, the combination of the eyelid statuses is not limited to that of the dominant eye and the other eye, but may be a combination of statuses of the right eyelid and the left eyelid.

In the processing at step S310, if the predetermined eyelid statuses of the user are not detected in the predetermined period (step S310: NO), the eye imaging cameras 37, 38 continue to monitor the eyelid statuses (step S310). If the predetermined eyelid statuses of the user are detected in the predetermined period (step S310: YES), the image display unit 20 shifts the display mode to the line-of-sight input mode (step S320). In the line-of-sight input mode, the image display unit 20 displays a control image. The line-of-sight input part 175 controls the head-mounted display device 100 and various devices connected to the head-mounted display device 100 based on the control image containing the position image showing the position corresponding to the line-of-sight direction of the user and the opened and closed statuses of the eyelids. Note that, in the following display modes of the image display unit 20 including the line-of-sight input mode, even when the statuses change to the normal statuses as the statuses in which both eyelids of the user are opened after the display mode shifts to the respective display modes, the display mode does not shift to another display mode. The image display unit 20 shifts to the other display mode only when specific eyelid statuses for changing the display mode are detected.

Then, the range sensor 63 monitors detection of a specific object at a predetermined distance from the range sensor 63 (step S330). If the specific object is not detected (step S330: NO), the range sensor 63 continues to monitor the detection of the specific object (step S330). If the specific object is detected (step S330: YES), the image determination part 142 determines whether or not the specific object is a set object previously set by pattern matching (step S340). In the embodiment, a human's palm is preset as the set object, however, another object than the palm may be set or the set object may be arbitrarily changed by the user in other embodiments.

In the processing at step S340, if the detected specific object is determined as not being the set object (step S340: NO), the range sensor 63 monitors detection of an object different from the detected specific object again (step S330). If the specific object is determined as being the set object (step S340: YES), the image determination part 142 determines whether or not the size of the specific object is equal to or more than a predetermined size (step S350). The image display unit 20 displays the control image set in response to the size of the imaged specific object.

If the size of the specific object is not equal to or more than the predetermined size (step S350: NO), the image determination part 142 adjusts the size of the control image according to the detected specific object (step S360). If the size of the control image is adjusted (step S360) or, if the size of the control image is determined as being equal to or more than the predetermined size (step S350: YES) in the processing at step S350, the image display unit 20 displays the control image including the position image showing the detected line-of-sight direction of the user (step S370).

Figure 6:
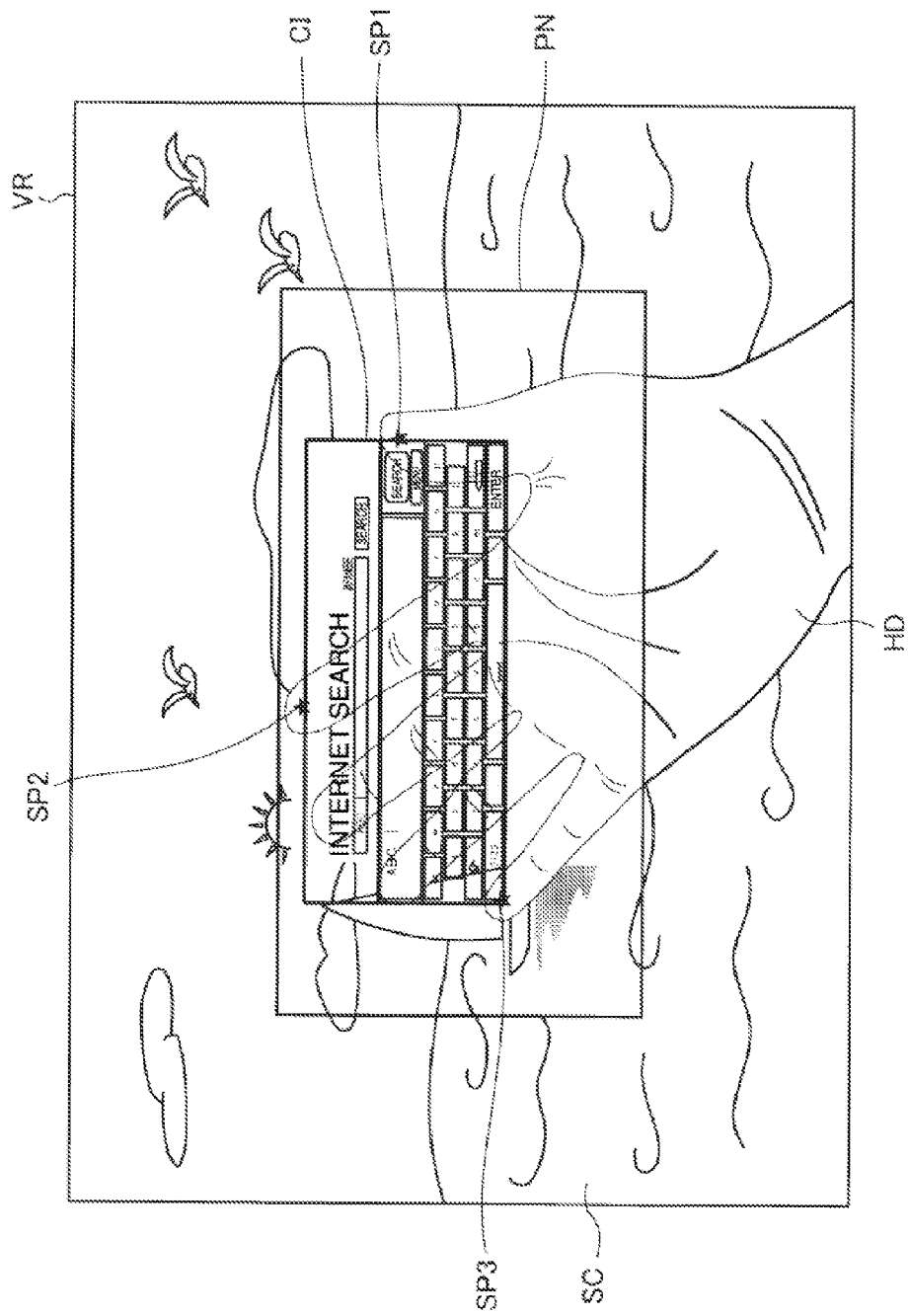
FIG. 6 is an explanatory diagram showing an example of a control image before size adjustment.

FIG. 6 is an explanatory diagram showing an example of a control image CI before size adjustment. FIG. 6 shows a visual range VR visually recognized by the user if the control image CI is displayed on the image display unit 20 before adjustment of the size of the control image CI. Note that, if the control image CI is determined as not being equal to or more than the predetermined size, the image is not displayed on the image display unit 20. Accordingly, the control image CI before size adjustment is not visually recognized. As shown in FIG. 6, in the visual range VR of the user, the transmitted outside scenery SC is visually recognized and the outside scenery SC contains a palm HD of the user. Note that the maximum image display area PN shows the maximum area in which the user may visually recognize image light generated by the image display unit 20. The outer frame of the maximum image display area PN is not visually recognized by the user, but, for convenience, shown by a solid line in FIG. 6.

When the image display unit 20 displays the control image CI, first, the image determination part 142 detects positions of a preset tip end SP1 of the thumb, a tip end SP2 of the index finger, and a tip end SP3 of the little finger in the palm HD of the user detected by pattern matching. The image display unit 20 displays a rectangular control image CI with at least one tip end of the tip end SP1 of the thumb, the tip end SP2 of the index finger, and the tip end SP3 of the little finger as an apex and lines passing through the other two tip ends in parallel to the lateral axis and the longitudinal axis of the maximum image display area PN as an outer frame. FIG. 6 shows the rectangular control image CI with the tip end SP3 of the little finger as an apex and passing through the tip end SP1 of the thumb and the tip end SP2 of the index finger. The image determination part 142 determines whether or not the respective lengths of the longitudinal and lateral sides of the outer frame of the generated control image CI are equal to or more than predetermined lengths, and thereby, determines whether or not the control image CI has a predetermined size or more. In FIG. 6, the longitudinal outer frame in the control image CI before size adjustment is less than the predetermined length, and the control image CI is determined as not having the predetermined size or more and the image display unit 20 adjusts the size of the control image CI and displays the image.

Figure 7:
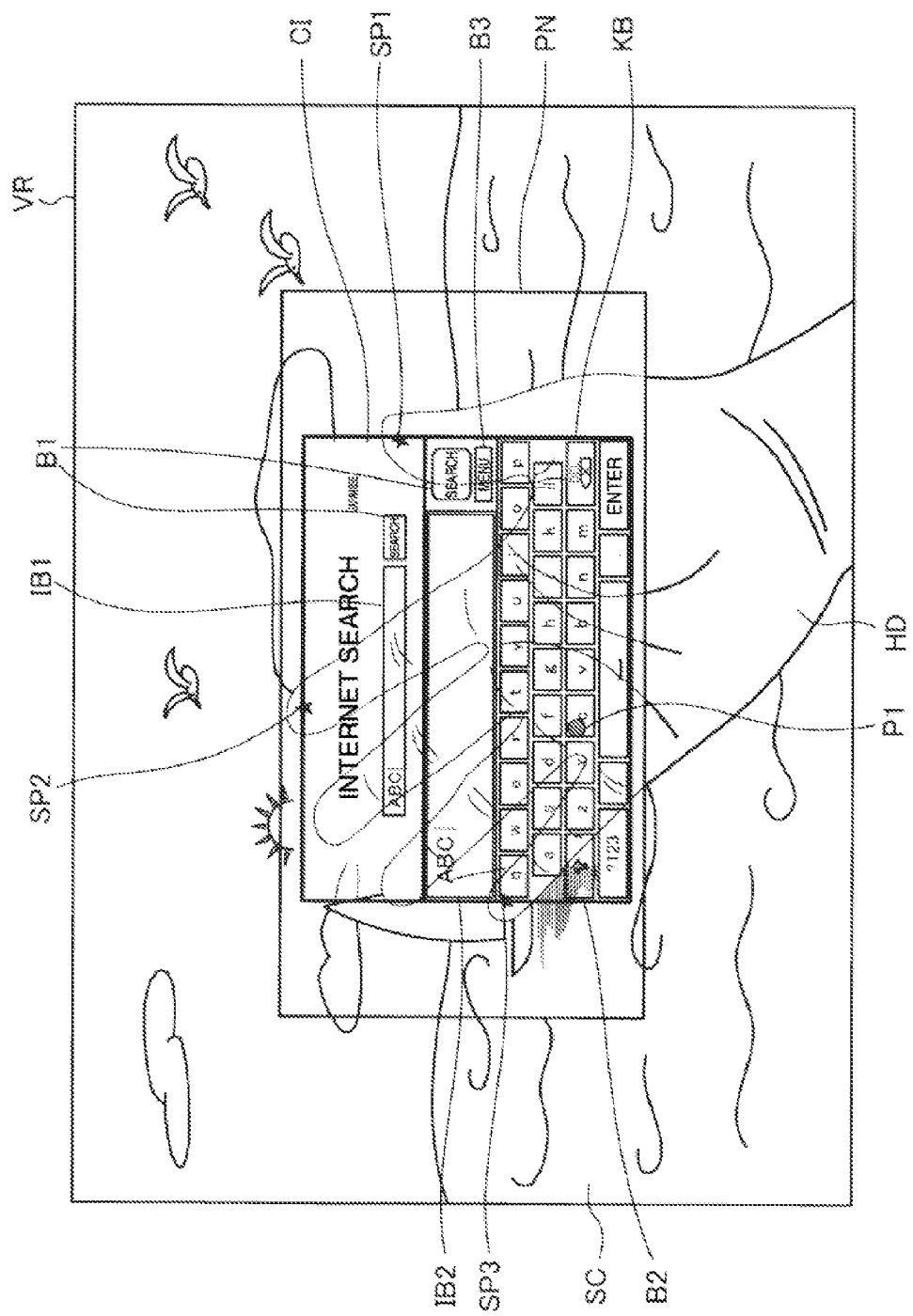
FIG. 7 is an explanatory diagram showing an example of the control image after size adjustment.

FIG. 7 is an explanatory diagram showing an example of the control image CI after size adjustment. FIG. 7 shows the control image CI having the size adjusted by the image display unit 20 and the visual range VR visually recognized by the user. As shown in FIG. 7, the image display unit 20 displays the control image CI after adjustment of lengthening the longitudinal outer frame that has determined as being less than the predetermined length. In FIG. 6, if the control image CI before size adjustment is displayed, the control image CI is generated in the upper part in the maximum image display area PN. Accordingly, after the size adjustment of the control image CI, as shown in FIG. 7, the image display unit 20 extends and displays the longitudinal outer frame of the control image CI. In the embodiment, the extended longitudinal length of the outer frame is an insufficient length with respect to the length set in advance when the control image CI is displayed.

As shown in FIG. 7, the displayed control image CI contains a pointer P1, a keyboard KB, entry spaces IB1, IB2, a search button B1, a switch key B2, and a menu switch key B3. The pointer P1 is a position image representing a position in response to the line-of-sight direction of the user in the control image CI. The keyboard KB is a keyboard in which the alphabet is arranged, and characters entered using the keyboard KB and the pointer P1 are displayed in the entry spaces IB1, IB2. The keyboard KB contains the switch key B2 for switching between the uppercase and the lowercase of the alphabet. The search button B1 is a button for execution of search on the Internet based on the characters entered in the entry spaces IB1, IB2. The menu switch key B3 is a button for switching the control image CI to a different control image such that a list of files stored in a specific folder is displayed. Note that the keys corresponding to the respective alphabet characters contained in the keyboard KB, the search button B1, the switch key B2, and the menu switch key B3 correspond to objects in the appended claims, and the pointer P1 corresponds to a pointer in the appended claims.

If the control image CI is displayed (step 370 in FIG. 4), then, the line-of-sight input part 175 monitors detection of input based on the line-of-sight directions and the eyelid statuses of the user (step S380 of FIG. 5). In the embodiment, the image determination part 142 determines the imaged line-of-sight direction of the right eye of the user, and the image display unit 20 displays the pointer P1 in a position corresponding to the line-of-sight direction of the right eye. Accordingly, the pointer P1 changes the position in the control image CI in response to the change in line-of-sight direction of the user. If the predetermined eyelid statuses showing the decision operation are not detected (step S380: NO), the line-of-sight input part 175 continues to monitor the eyelid statuses showing the decision operation (step S380).

In the processing at step S380, if the pointer P1 overlaps with a selectable button in the control image CI and the statuses of the left eyelid closed in a predetermined period and a wink of the right eyelid as the eyelid statuses showing the decision operation are detected (step S380: YES), the line-of-sight input part 175 performs input operation. The line-of-sight input part 175 decides the key overlapping with the pointer P1 and performs input operation, and the image display unit 20 displays the entry result in the entry spaces IB1, IB2 (step S390). As shown in FIG. 7, in the entry spaces IB1, IB2, "A", "B", "C" are entered and displayed in the capital letters of the alphabet. In the embodiment, after the switch key B2 is decided, when "a" of the alphabet is entered, the image display unit 20 displays the capital letter "A" in the entry spaces IB1, IB2. Accordingly, the entry result of the entry spaces IB1, IB2 in FIG. 7 is obtained by sequential selection of the switch key B2, "a", the switch key B2, "b", the switch key B2, and the "c" key. Note that, in other embodiments, if the switch key B2 is entered, then, the uppercase and the lowercase of the alphabet may be switched and fixed, or the lowercases of the alphabet on the respective keys of the keyboard KB may be changed to the uppercases and displayed.

Then, the eye imaging cameras 37, 38 end the entry in the entry spaces IB1, IB2 and monitor detection of the eyelid statuses showing operation for search on the Internet (step S400 of FIG. 4). If the eyelid statuses showing operation for Internet search are not detected (step S400: NO), the cameras continue to monitor the detection of the eyelid statuses showing decision operation (step S380). If the eyelid statuses for decision of the search button B1 showing the operation for Internet search (step S400: YES) are detected, the control unit 10 performs Internet search via the wireless communication part 132, and the image display unit 20 displays a search result (step S410). If the search result is displayed, as is the case where the control image CI is displayed, the position in which the pointer P1 is displayed is changed based on the change in line-of-sight direction determined by the image determination part 142. Further, if the eyelid statuses showing decision are detected, the line-of-sight input part 175 performs various kinds of operation based on the positions of selectable icons in the displayed search result or the like and the pointer P1.

Then, the eye imaging cameras 37, 38 monitor detection of the eyelid statuses showing operation of changing the search result displayed on the image display unit 20 to a different displayed image (step S420). If the statuses in which the right eyelid is closed and the left eyelid is opened in a predetermined period are detected as the operation of changing the displayed search result (step S420: YES), the eye imaging cameras 37, 38 monitor detection of input (step S380). If the eyelid statuses for changing the displayed search result are not detected (step S420: NO), the eye imaging cameras 37, 38 monitor detection of the eyelid statuses showing operation of ending the line-of-sight operation input processing (step S430). If the eyelid statuses showing the operation of ending the line-of-sight operation input processing are not detected (S430: NO), the eye imaging cameras 37, 38 monitor detection of input (step S380). If the statuses in which both eyelids are closed in a predetermined time and only the right eyelid is opened in a predetermined time are detected as the operation of ending the line-of-sight operation input (S430: YES), the control unit 10 ends the line-of-sight operation input processing.

As described above, in the head-mounted display device 100 in the embodiment, the image display unit 20 displays the control image CI containing the pointer P1, the keyboard KB, the entry spaces IB1, IB2, the search button B1, the switch key B2, and the menu switch key B3. The line-of-sight input part 175 controls the head-mounted display device 100 based on the positional relationship between the keyboard KB or the like and the pointer P1. Accordingly, in the head-mounted display device 100 in the embodiment, the user may perform various kinds of control of the head-mounted display device 100 without using hands based on the line-of-sight directions of the user, and the operability of the user is improved. Further, the user may perform control of the head-mounted display device 100 without the user interface including the keyboard having a form as an object, and the portability of the head-mounted display device 100 is improved.

Further, in the head-mounted display device 100 in the embodiment, the eye imaging cameras 37, 38 image the right eye and the left eye of the user, respectively, and the image determination part 142 determines the opened and closed statuses of both eyelids. The line-of-sight input part 175 selects keys of the alphabet in the keyboard KB based on the positional relationship between the keyboard KB and the pointer P1, and performs decision of the selected keys based on the opened and closed statuses of the eyelids. Accordingly, in the head-mounted display device 100 in the embodiment, the head-mounted display device 100 is controlled based on the line-of-sight directions of the user and the opened and closed statuses of the eyelids, and thus, the user may control the head-mounted display device 100 completely without using hands and the operability of the user is improved. Further, decision is performed based on the combination of the opened and closed statuses of the eyelids, and thus, many combinations of decision corresponding to the kinds of operation may be provided to the user and the operability of the user is improved.

Furthermore, in the head-mounted display device 100 in the embodiment, the image determination part 142 performs pattern matching as to whether or not the object detected by the range sensor 63 is the same as the set object registered in advance. By the pattern matching of the image determination part 142, if the specific object is the set object registered in advance, the image display unit 20 displays the control image CI set in response to the size of the imaged specific object. Accordingly, in the head-mounted display device 100 in the embodiment, the size of the control image CI is changed in response to the size of the object recognized by the image determination part 142, and thus, the user may sensually adjust the size of the control image CI and the convenience of the user is improved. Further, the user may simply hold the palm HD in front of the eye for changing the control image CI from the non-displayed state to the displayed state, and thus, the convenience of the user is improved.

Figure 8:
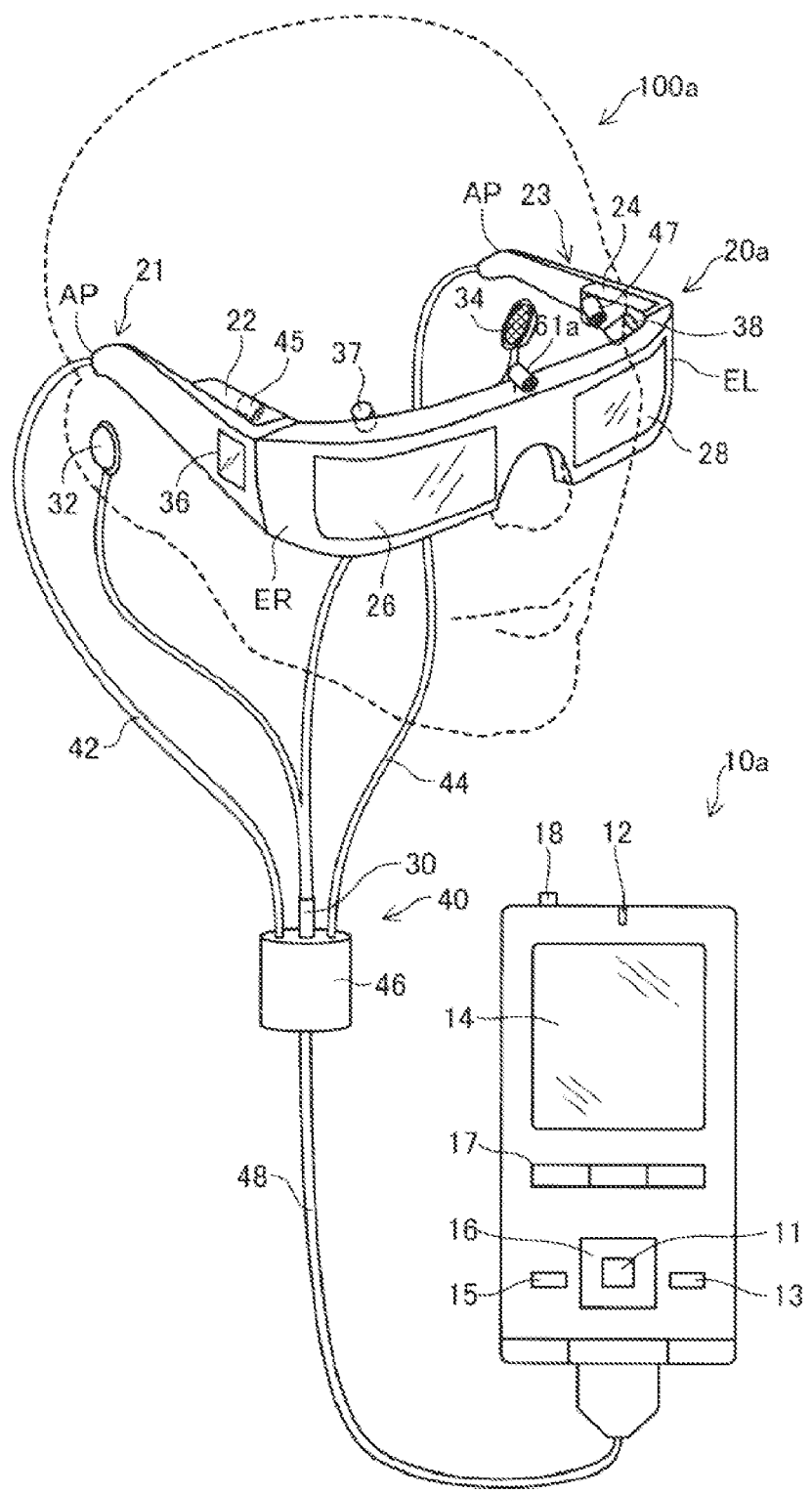
FIG. 8 is an explanatory diagram showing an outer configuration of a head-mounted display device in the second embodiment.

B. Second Embodiment:

FIG. 8 is an explanatory diagram showing an outer configuration of a head-mounted display device 100a in the second embodiment. In the second embodiment, compared to the first embodiment, the shape of an outside scenery imaging camera 61a is different and a track pad 36 is formed in an image display unit 20a. The outside scenery imaging camera 61a in the second embodiment is a monocular camera, however, may be a stereo camera. The angle of view of the outside scenery imaging camera 61a used in the second embodiment is 40 degrees respectively in the vertical directions and 60 degrees respectively in the horizontal directions from the start point of the optical axis.

The track pad 36 detects finger operation of the user on the operation surface of the track pad 36, and outputs a signal in response to the detection. When the user wears the image display unit 20a on the head, the track pad 36 is located on the surface opposite to the temporal part of the user facing the right display drive part 22. As the track pad 36, various track pads of electrostatic type, pressure detection type, and optical type may be employed. Note that the track pad 36 is provided in the right display drive part 22 in the second embodiment, however, the track pad may be provided in the left display drive part 24 or detachably adapted from the image display unit 20a in the other embodiments.

Figure 9:
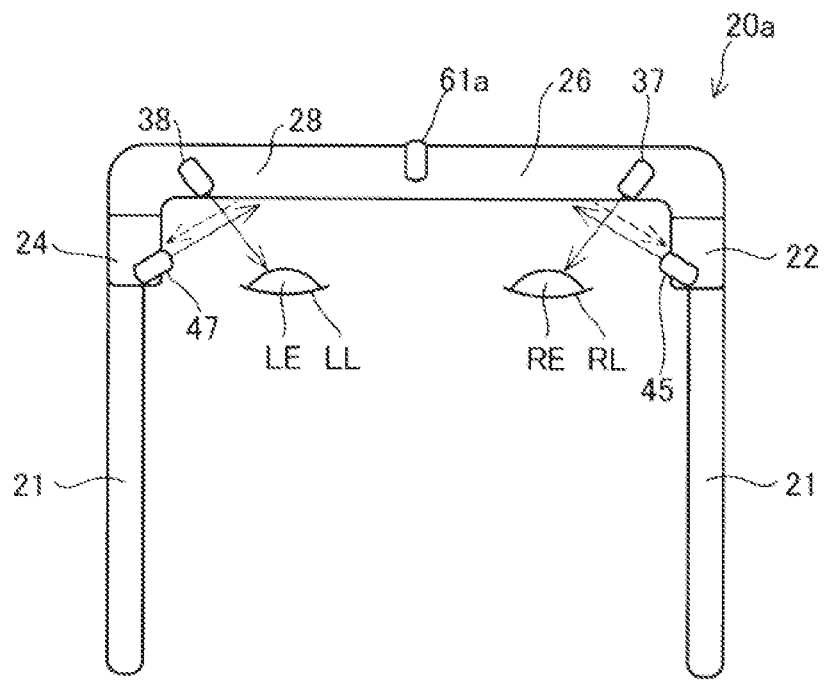
FIG. 9 is an explanatory diagram showing schematic relations among various sensors in the image display unit and the eyelids of the user.

FIG. 9 is an explanatory diagram showing schematic relations among various sensors in the image display unit 20a and eyelids of the user. FIG. 9 schematically shows the image display unit 20a and the user wearing the image display unit 20a on the head as seen from above the head of the user. The right-eye imaging camera 37 and the left-eye imaging camera 38 image the right eye RE and the left eye LE of the user, respectively, and image the right eyelid RL and the left eyelid LL of the user at the same time. Accordingly, the eye imaging cameras 37, 38 image the opened and closed statuses of both eyelids of the user.

The right-eye illuminance sensor 45 and the left-eye illuminance sensor 47 each have a light emitting device and a light receiving device, and detect illuminance by detecting reflected lights between the right eye RE and the left optical image display part 28 and the left eye LE and the right optical image display part 26 with respect to the light emission of the illuminance sensors 45, 47.

Figure 10:
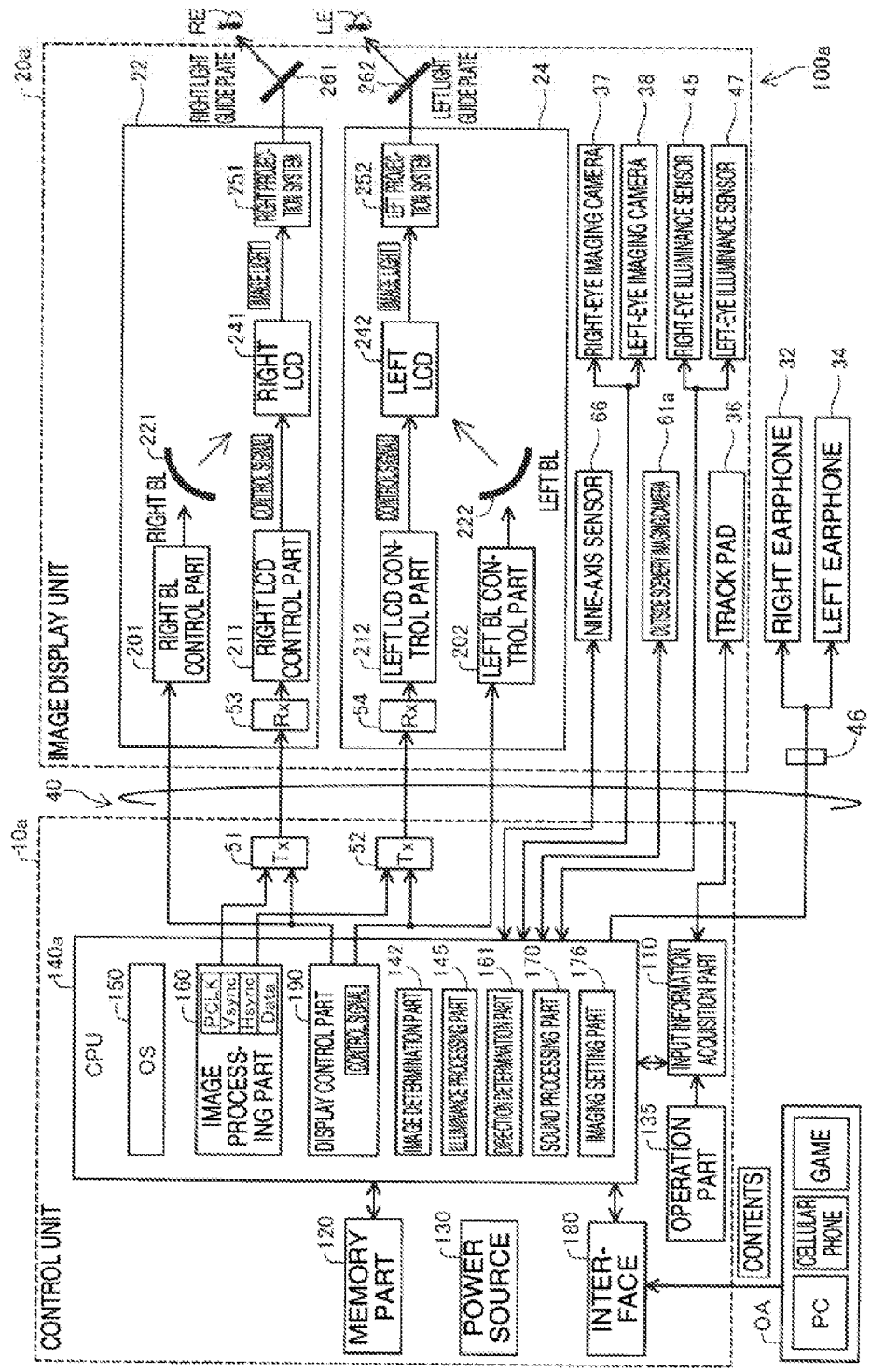
FIG. 10 is a block diagram functionally showing a configuration of the head-mounted display device.

FIG. 10 is a block diagram functionally showing a configuration of the head-mounted display device 100a. The second embodiment is different from the first embodiment in that a CPU 140a in a control unit 10a functions as an imaging setting part 176 in place of the line-of-sight input part 175.

The imaging setting part 176 performs various settings of the outside scenery imaging camera 61a based on the angles calculated by the direction determination part 161, the determination of the illumination processing part 145, the opened and closed degrees of the eyelids determined by the image determination part 142, the estimated line-of-sight directions or the like, and generates image signals showing the entire or part of the imaged outside scenery for the image display unit 20a. The direction determination part 161 may estimate the line-of-sight directions of the user because the orientation of the image display unit 20a is known from the motion of the head of the user detected by the nine-axis sensor 66.

Figure 11:
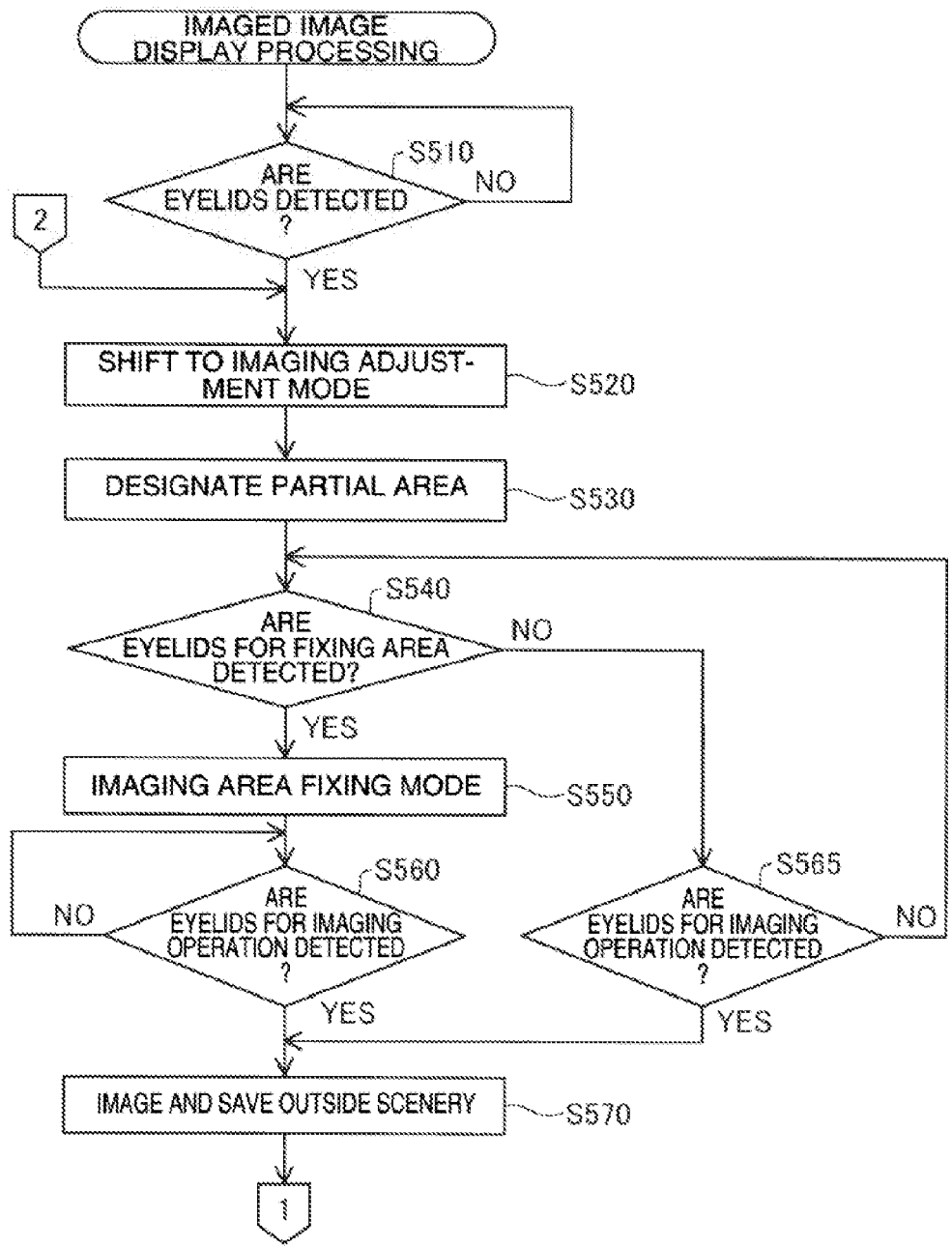
FIG. 11 is an explanatory diagram showing a flow of imaged image display processing.
Figure 12:
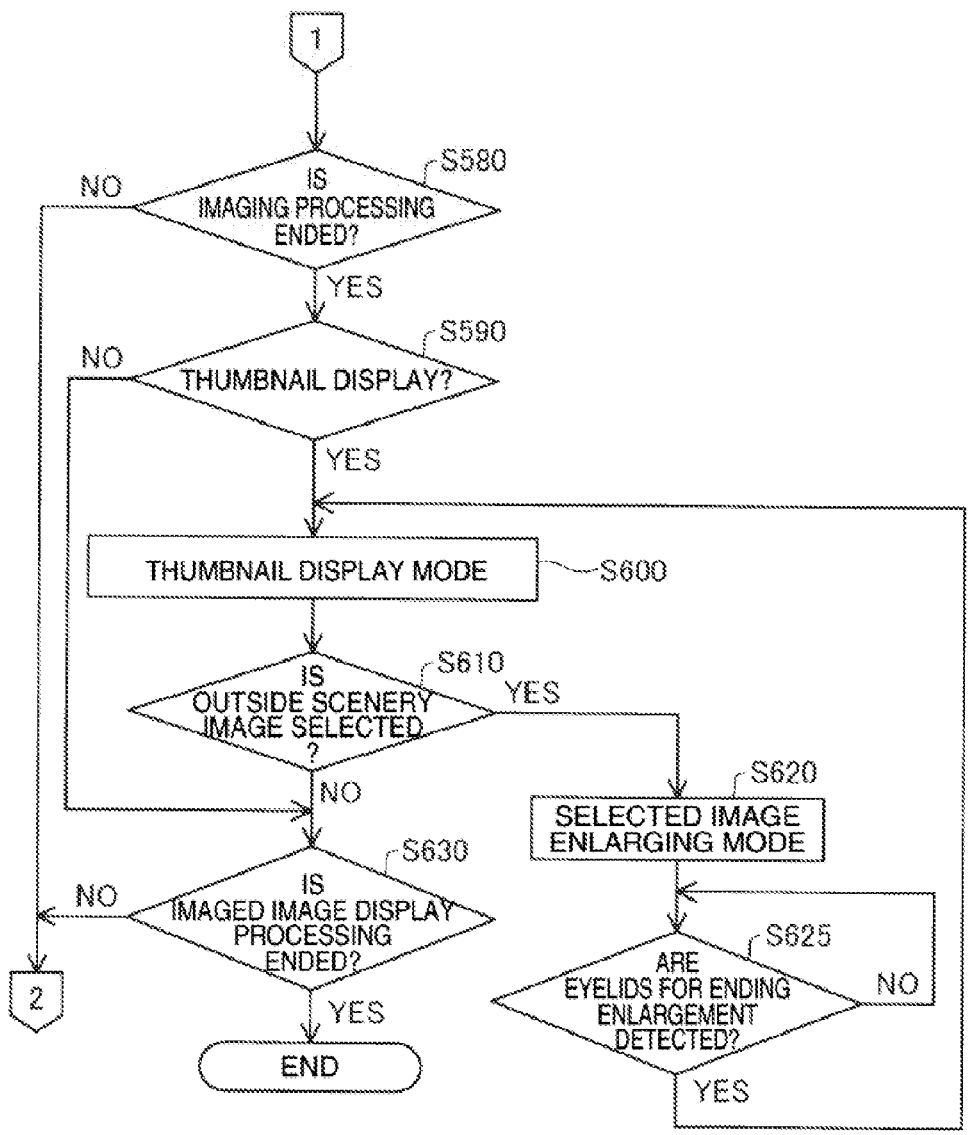
FIG. 12 is an explanatory diagram showing a flow of the imaged image display processing.

FIGS. 11 and 12 are explanatory diagrams showing a flow of imaged image display processing. In the imaged image display processing, if the predetermined eyelid statuses of the user are detected, the display mode of the image display unit 20a is shifted to an imaging adjustment mode in which the user may image the outside scenery based on the eyelid statuses.

FIG. 13 is an explanatory diagram showing examples of processing assigned to the opened and closed statuses of the eye lids in the imaged image display processing. FIG. 13 shows a list of the eyelid statuses for shift of the display mode of the image display unit 20a and processing in the respective display modes. In the embodiment, for example, the eyelid statuses for shifting the display mode of the image display unit 20a to the imaging adjustment mode are a combination of the status in which the right eye as the dominant eye of the user is opened and the status in which the eyelid of the left eye not the dominant eye is closed (wink).

In the imaged image display processing, first, the eye imaging cameras 37, 38 monitor whether or not predetermined eyelid statuses of the user are detected in a predetermined period (step S510 of FIG. 5). If the predetermined eyelid statuses of the user are not detected in the predetermined period (step S510: NO), the eye imaging cameras 37, 38 continue to monitor the eyelid statuses (step S510). If the predetermined eyelid statuses of the user are detected in the predetermined period (step S510: YES), the imaging setting part 176 shifts the display mode of the image display unit 20a to the imaging adjustment mode (step S520). In the imaging adjustment mode, the imaging setting part 176 sets image data to be generated and stored and the image displayed on the image display unit 20a of the outside scenery imaged by the outside scenery imaging camera 61a based on the opened and closed statuses of both eyelids of the user and the line-of-sight direction of the right eye of the user. Note that, in the following display modes of the image display unit 20a including the imaging adjustment mode, even when the statuses of both eyelids return to the normal statuses after the display mode shifts to the respective display modes, the display mode does not shift to another display mode unless the eyelid statuses for changing the display mode are detected.

Figure 14:
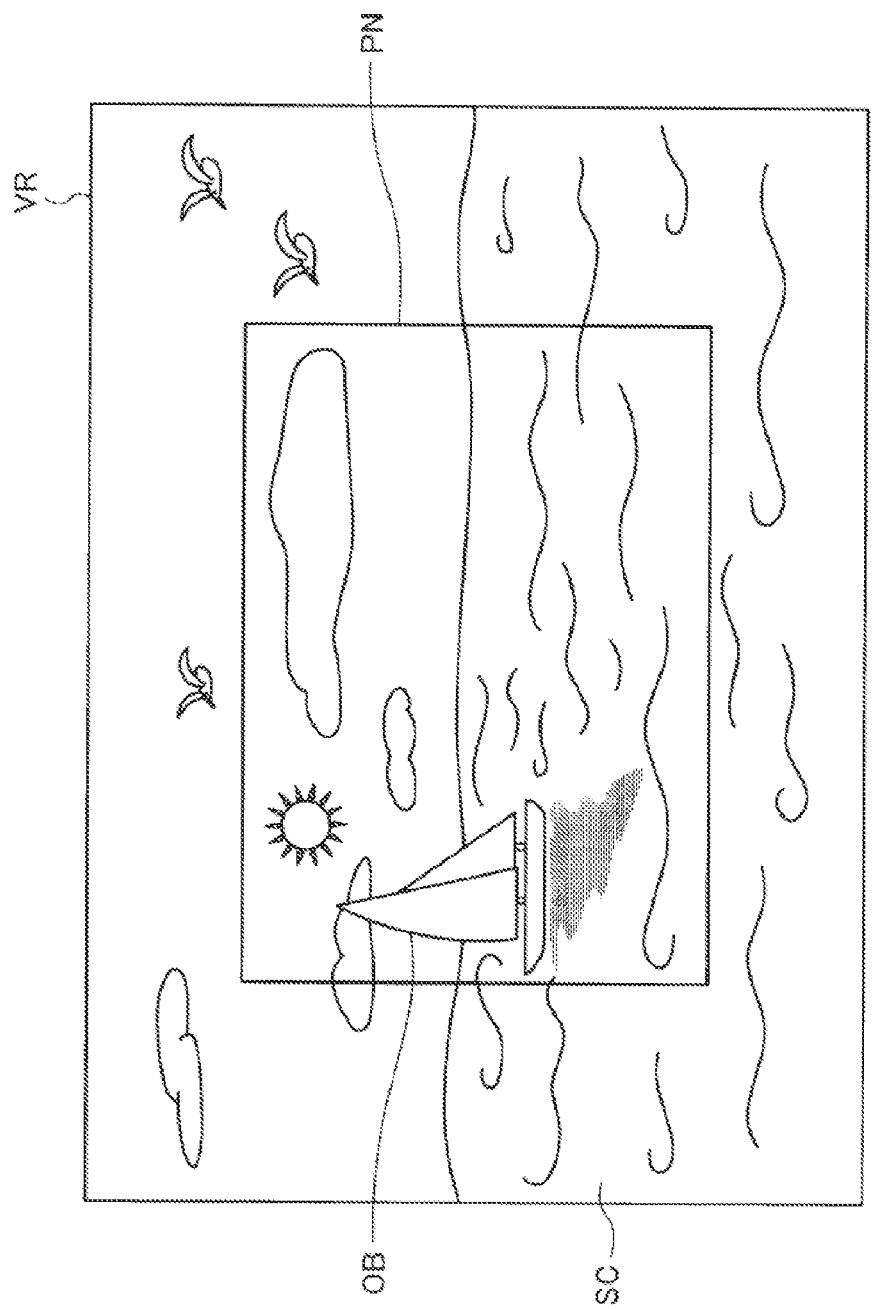
FIG. 14 is an explanatory diagram showing an example of a visual range visually recognized by a user.
Figure 15:
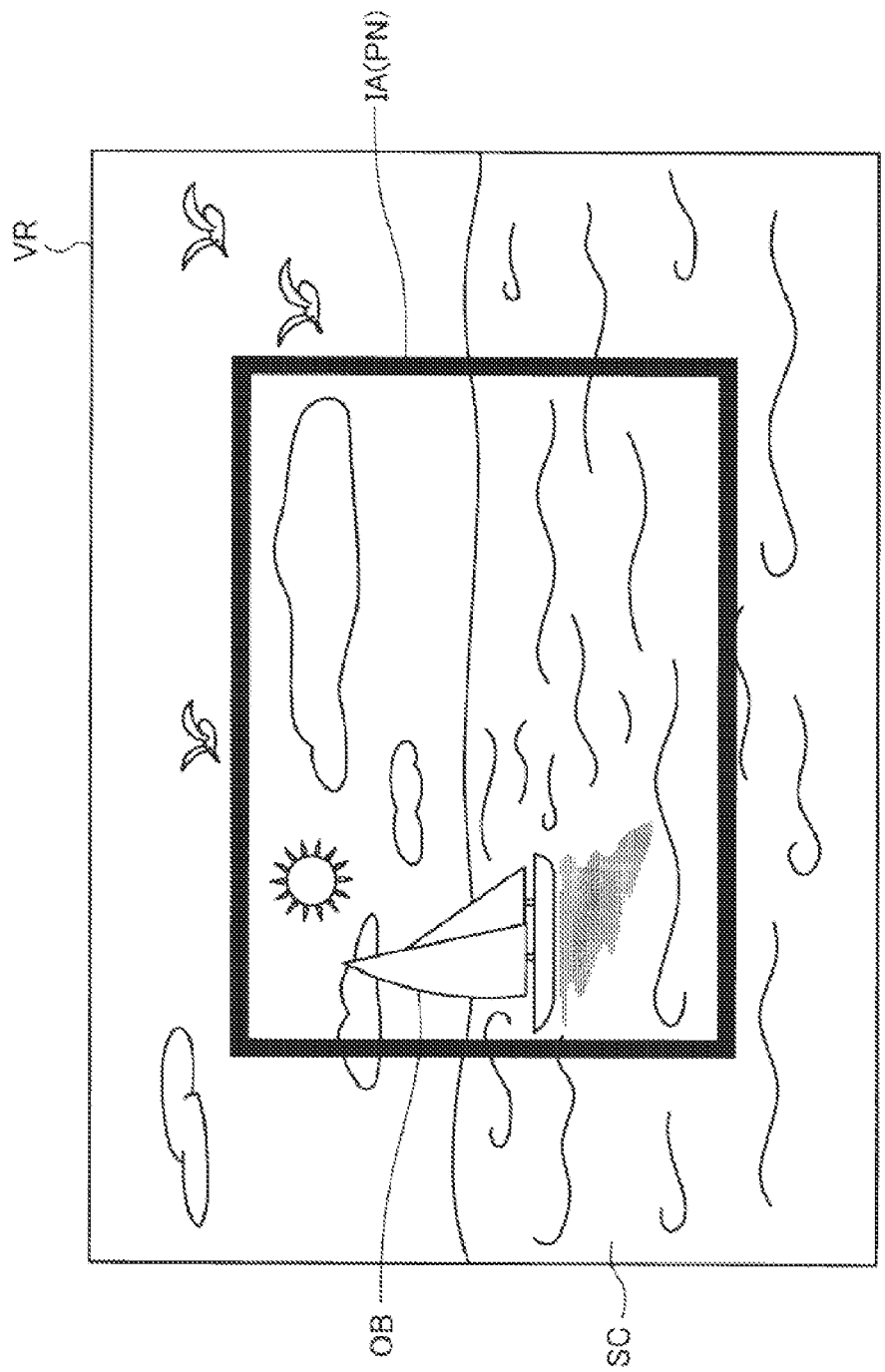
FIG. 15 is an explanatory diagram showing an example of the visual range visually recognized by the user.

The respective drawings from FIGS. 14 to 20 are explanatory diagrams showing examples of the visual range VR visually recognized by the user. FIG. 14 shows the visual range VR before shift to the image adjustment mode, and FIG. 15 shows the visual range VR in the image adjustment mode. FIG. 14 shows outside scenery SC transmitted through the image display unit 20a and visually recognized by the user, and the outside scenery SC contains a sailboat OB as a subject. The maximum image display area PN in the second embodiment has 960 of lateral pixels and 540 of longitudinal pixels, and the different numbers of pixels may be employed in other embodiments.

Figure 16:
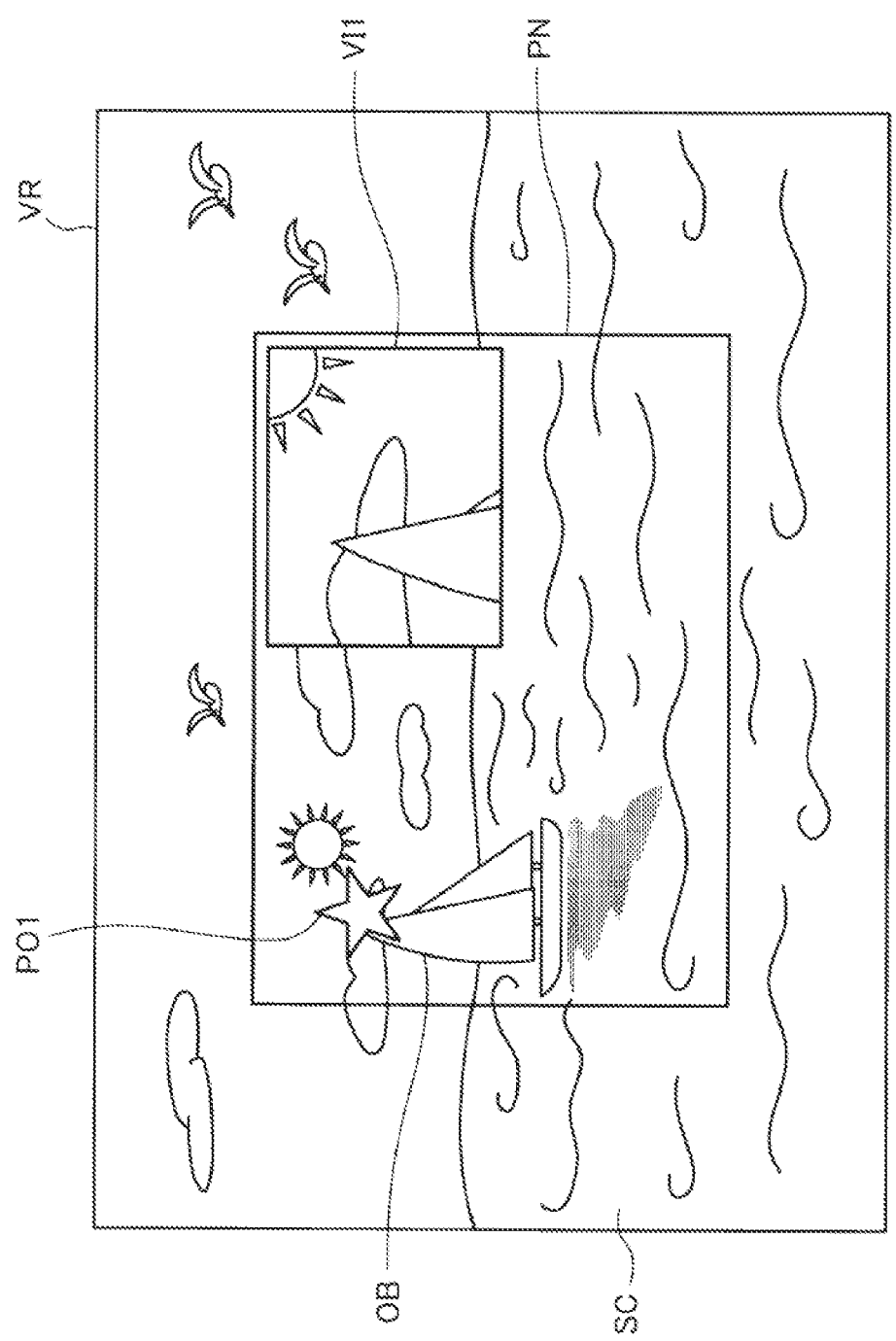
FIG. 16 is an explanatory diagram showing an example of the visual range visually recognized by the user.

FIG. 15 is a different from FIG. 16 in that the image display unit 20a displays an image range outer frame IA showing the range of generated image data. The image range outer frame IA is a blue line and the same as the outer frame of the maximum image display area PN in the initial state after shift to the image adjustment mode, and then, changed according to the setting of the line-of-sight direction of the user or the like. In the image adjustment mode, when the focal length of the optical zoom lens of the outside scenery imaging camera 61a is changed, the imaging setting part 176 displays the image range outer frame IA when the focal length is from 35 millimeters to 50 millimeters in the image adjustment mode. The details of the case where the focal length is less than 35 millimeters and over 50 millimeters will be described later. Note that the image range outer frame IA is not limited to the blue line, but may be another kind of line in another color and variously changed in a range in which the user may visually recognize the area surrounded by the image range outer frame IA.

If the image range outer frame IA is displayed, then, the imaging setting part 176 designates a partial area of the outside scenery SC imaged by the outside scenery imaging camera 61a based on the received operation (step S530 of FIG. 11). FIG. 16 shows the visual range VR visually recognized by the user when the partial area of the imaged outside scenery SC is designated in the image adjustment mode. FIG. 16 shows a pointer PO1 showing the estimated line-of-sight direction of the user and an imaged image VI1 showing a predetermined area around the pointer PO1. In the image adjustment mode, if the half-closed status of the right eye is detected, the image display unit 20a displays the pointer PO1. When the pointer PO1 is displayed, if the line-of-sight direction of the left eye is changed, the left-eye imaging camera 38 and the image determination part 142 estimate the line-of-sight direction. The image display unit 20a changes the position in which the pointer PO1 is displayed based on the estimated line-of-sight direction, and displays the image showing the predetermined area around pointer PO1 in the imaged image VI1.

When the pointer PO1 is displayed, if the imaging setting part 176 changes the focal length, the image displayed in the imaged image VI1 is enlarged or reduced. In the embodiment, if the right eye is half-closed, the focal length automatically and gradually increases and, when reaching a certain focal length, the focal length gradually decreases. If the image determination part 142 detects the change of the right eye from the half-closed status to the normal status, the imaging setting part 176 sets the focal length at the time when the normal opened status of the right eye is detected. If the focal length is less than 35 millimeters, the image display unit 20a displays an outside scenery image in which the partial area around the pointer PO1 is enlarged in the imaged image VI1. If the focal length is over 50 millimeters, the image display unit 20a displays an outside scenery image in which the partial area around the pointer PO1 is reduced in the imaged image VI1. If the focal length of the optical zoom lens is from 35 millimeters to 50 millimeters, an outside scenery image having nearly the same size as that of the outside scenery SC visually recognized by the user is imaged, and thus, the user may visually recognize the outside scenery SC in the wider range without display of the imaged image VI1. Further, if the focal length of the optical zoom lens is less than 35 millimeters or over 50 millimeters, the imaged image VI1 is displayed, and thereby, the user may visually recognize the outside scenery SC while confirming the imaged outside scenery image.

Figure 17:
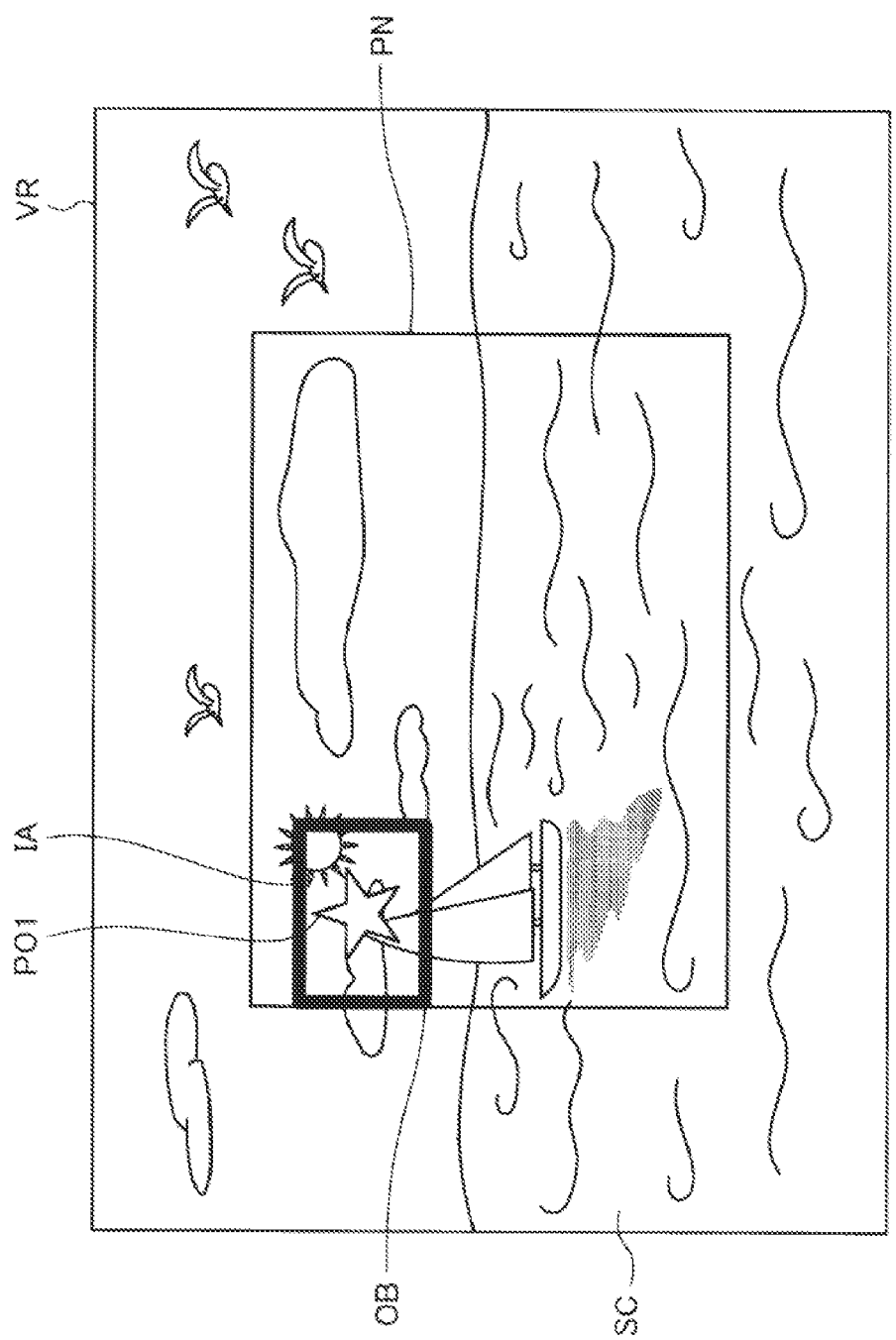
FIG. 17 is an explanatory diagram showing an example of the visual range visually recognized by the user.

FIG. 17 shows the visual range VR visually recognized by the user if the focal length of the outside scenery imaging camera 61a is set to be from 35 millimeters to 50 millimeters in the imaging adjustment mode. If the focal length is set to be from 35 millimeters to 50 millimeters, the imaging setting part 176 does not display the imaged image VI1, but displays the image range outer frame IA around the pointer PO1. Note that, not the image range outer frame IA, but the imaged image VI1 may be continuously displayed regardless of the focal length in the other embodiments.

Then, when the pointer PO1 is displayed, the right-eye imaging camera 37 monitors detection of the eyelid status showing shift to an imaging area fixing mode in which the partial area around the pointer PO1 is fixed and continuously imaged (step S540 of FIG. 11). If the right-eye imaging camera 37 detects the closed status of the right eyelid in a predetermined period (step S540: YES), the imaging setting part 176 shifts the display mode of the image display unit 20a to the imaging area fixing mode in which the partial area around the pointer PO1 is continuously imaged (step S550).

Figure 18:
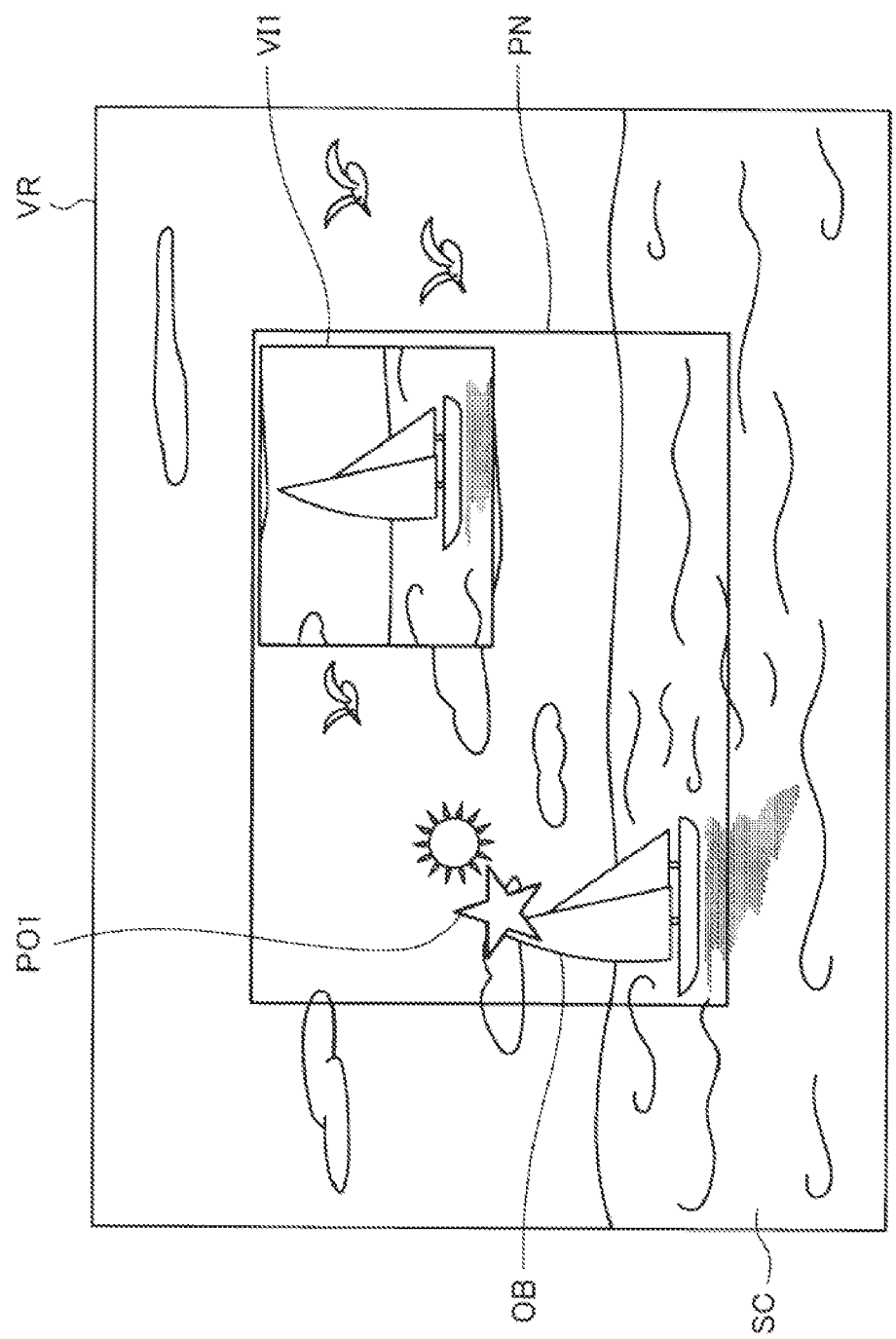
FIG. 18 is an explanatory diagram showing an example of the visual range visually recognized by the user.

FIG. 18 shows the visual range VR visually recognized when the user faces the upper direction in the imaging area fixing mode. The imaging setting part 176 adjusts the orientation of the outside scenery imaging camera 61a with respect to the image display unit 20a so that the outside scenery imaging camera 61a may image the set direction of the pointer PO1 based on the orientation of the image display unit 20a detected by the nine-axis sensor 66 and the direction determination part 161. If the orientation of the outside scenery imaging camera 61a is adjusted, the right-eye imaging camera 37 monitors detection of the eyelid status showing the operation of imaging the outside scenery SC (step S560 of FIG. 11). If the status of the right eyelid opened and closed twice in a predetermined period as the eyelid status showing the imaging operation is not detected (step S560: NO), the right-eye imaging camera 37 continues to monitor the eyelid status (step S560). In the processing at step S560, if the predetermined eyelid status is detected (step S560: YES), the outside scenery imaging camera 61a images the outside scenery SC and the imaging setting part 176 generates and stores image data representing the outside scenery SC displayed in the imaged image VI1 (step S570). The image display unit 20a displays an image showing the generated image data in a fixed period in a predetermined range in the maximum image display area PN, and then, returns to the imaging area fixing mode.

In the processing at step S540, if the eyelid status showing shift to the imaging area fixing mode is not detected (step S540: NO), the right-eye imaging camera 37 monitors detection of the eyelid status showing the same imaging operation as that in the processing at step S560 (step S565) in the imaging adjustment mode. If the eyelid status showing the imaging operation is not detected (step S565: NO), the right-eye imaging camera 37 monitors detection of the eyelid status showing shift to the imaging area fixing mode (step S540). In the processing at step S565, if the eyelid status showing the imaging operation is detected (step S565: YES), the outside scenery imaging camera 61a images the outside scenery SC and the imaging setting part 176 generates and stores image data representing the outside scenery SC displayed in the imaged image VI1 (step S570). The image display unit 20a displays an image showing the generated image data in a fixed period in a predetermined range in the maximum image display area PN, and then, returns to the imaging adjustment mode.

Next, the eye imaging cameras 37, 38 monitor detection of the eyelid statuses showing operation of ending the imaging processing (step S580 of FIG. 12). If the statuses in which both eyelids of the user are opened showing the operation of ending the imaging processing (step S580: NO) are not detected, the eye imaging cameras 37, 38 perform processing at step S320 and the subsequent steps again. If detecting the eyelid statuses showing the operation of ending the imaging processing (step S580: YES), the eye imaging cameras 37, 38 monitor detection of eyelid statuses showing shift to a thumbnail display mode in which the stored outside scenery images are displayed in a list (step S590). If the three times of winking of both eyelids is detected in a predetermined period showing the eyelid statuses showing shift to the thumbnail display mode (step S590: YES), the imaging setting part 176 shifts the display mode of the image display unit 20a to the thumbnail display mode (step S600).

Figure 19:
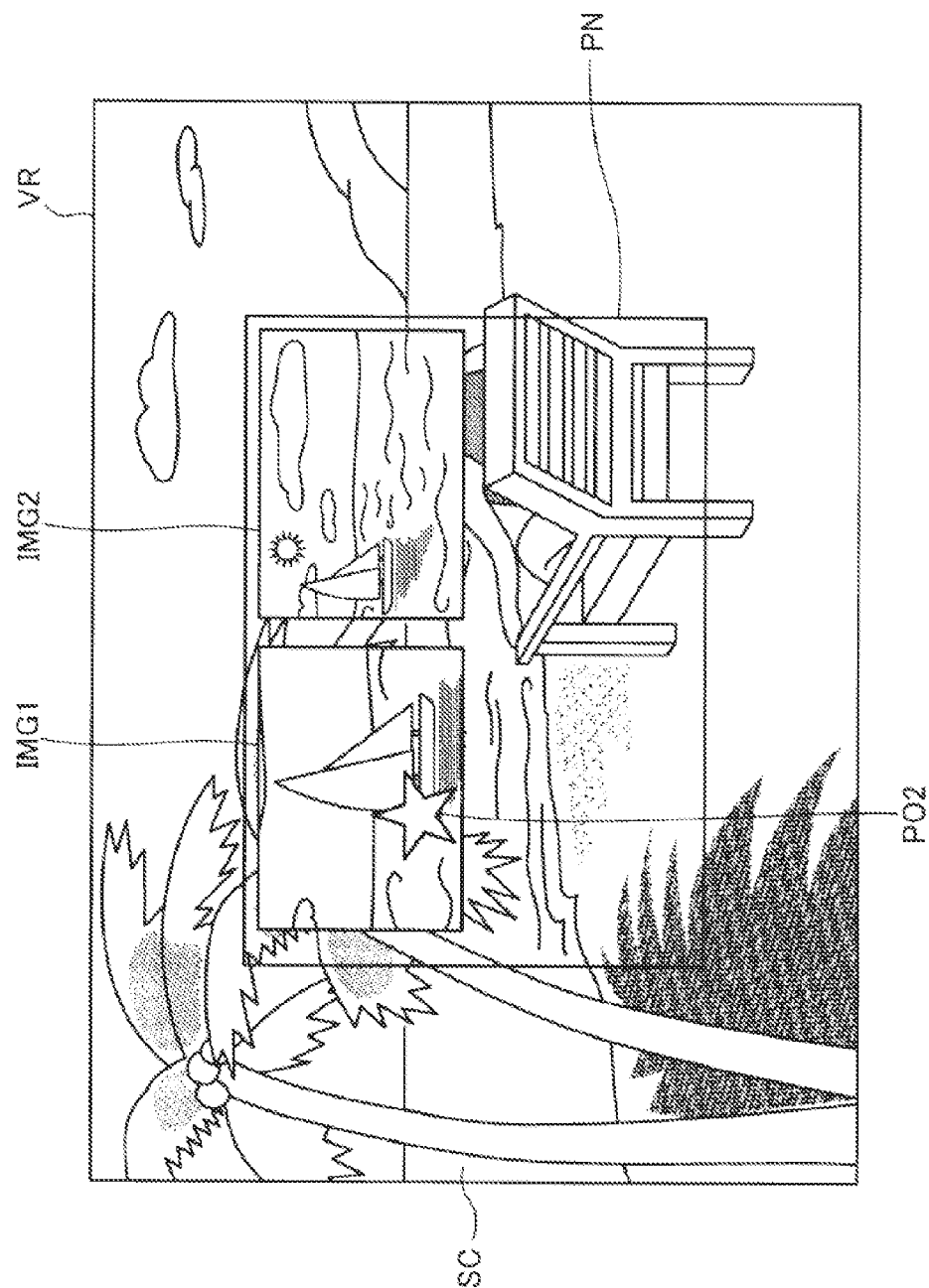
FIG. 19 is an explanatory diagram showing an example of the visual range visually recognized by the user.

FIG. 19 shows the visual range VR visually recognized by the user in the thumbnail display mode. As shown in FIG. 19, the user visually recognizes imaged images IMG1, IMG2, and a pointer PO2 displayed in the image display unit 20a. In the thumbnail display mode, if the eye imaging cameras 37, 38 detect the eyelid statuses in which the user closes the right eye and opens the left eye (wink) in a predetermined period, the image display unit 20a displays the pointer PO2. When the pointer PO 2 is displayed, if the line-of-sight direction of the left eye of the user is changed, the left-eye imaging camera 38 and the image determination part 142 estimate the line-of-sight direction. The image display unit 20a changes the position in which the pointer PO2 showing the line-of-sight direction of the user is displayed based on the estimated change in line-of-sight direction.

Then, the left-eye imaging camera 38 monitors detection of the eyelid status showing operation of selecting one image of the imaged images IMG1, IMG2 displayed in the maximum image display area PN (step S610 of FIG. 12). As shown in FIG. 19, when the pointer PO2 overlaps with the imaged image IMG1, if the left-eye imaging camera 38 detects a wink of the left eye twice showing the operation of selecting the imaged image IMG1 in a predetermined period (step S610: YES), the imaging setting part 176 shifts the display mode of the image display unit 20a to a selected image enlarging mode (step S620).

Figure 20:
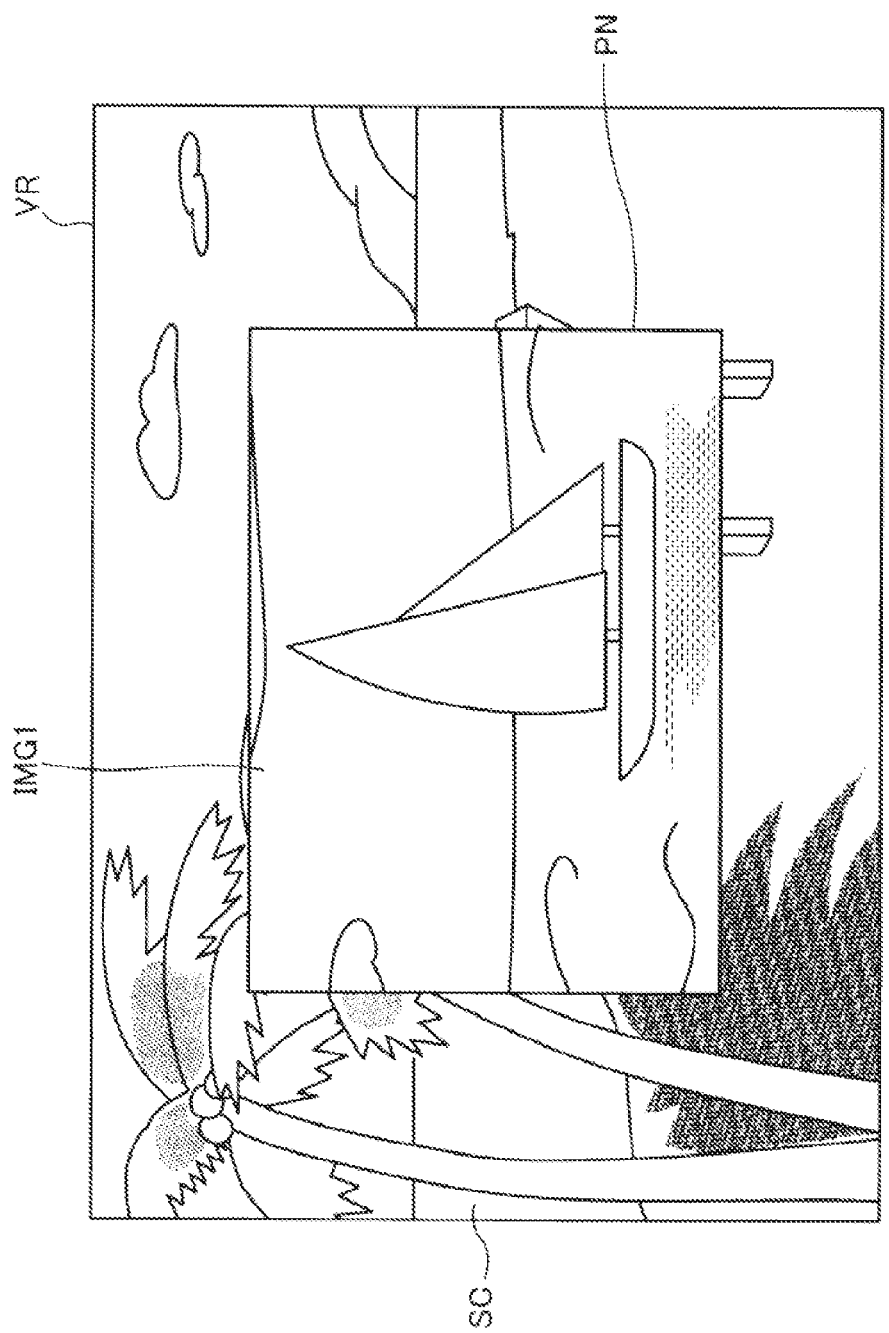
FIG. 20 is an explanatory diagram showing an example of the visual range visually recognized by the user.

FIG. 20 shows the visual range VR visually recognized by the user in the selected image enlarging mode. As shown in FIG. 20, in the selected image enlarging mode in which the imaged image IMG is selected, the imaged image IMG1 is enlarged and displayed in the entire area of the maximum image display area PN. If the imaged image IMG1 is enlarged and displayed, the eye imaging cameras 37, 38 monitor detection of eyelid statuses showing operation of ending the selected image enlarging mode (step S625 of FIG. 12). If the closed statuses of both eyelids are not detected in a fixed period showing the eyelid statuses for ending the selected image enlarging mode (step S625: NO), the imaged image IMG1 is continuously enlarged and displayed in the maximum image display area PN. If the eyelid statuses for ending the selected image enlarging mode are detected (step S625: YES), the imaging setting part 176 shifts the display mode of the image display unit 20a to the thumbnail display mode and the processing at step S600 and the subsequent steps is performed.

In the processing at step S590 or the processing at step S610, if the predetermined eyelid statuses are not detected (step S590: NO, step S610: NO), the eye imaging cameras 37, 38 monitor detection of the eyelid statuses showing operation of ending imaged image display processing (step S630). If the change of the eyelid status of the wink with the left eye closed to the eyelid status of the wink with the right eye closed showing ending of the imaged image display processing is not detected (step S630: NO), the processing at step S520 and the subsequent steps in FIG. 11 is performed again. In the processing at step S630 of FIG. 12, if the eyelid statuses showing ending of the imaged image display processing are detected (step S630: YES), the imaged image display processing is ended.

As described above, in the head-mounted display device 100a in the second embodiment, the eye imaging cameras 37, 38 and the image determination part 142 detect the eyelid statuses as shielding objects that shield the lines of sight of the user, and the imaging setting part 176 performs the operation of the image display unit 20a based on the detection result of the eyelids as the shielding objects shielding the lines of sight analyzed by the image determination part 142. Accordingly, in the head-mounted display device 100a in the second embodiment, the user images the outside scenery SC while visually recognizing it, and thereby, image data representing a partial area of the outside scenery SC is generated. Therefore, the user may image the outside scenery SC while visually recognizing it without especially seeing through a viewfinder or the like, imaging may be easily timed, and the convenience of the user is improved. Further, the user may image the outside scenery SC without touching the control unit 10a or the image display unit 20a, and may perform imaging with suppressed camera shake.

Further, in the head-mounted display device 100a in the second embodiment, the right-eye imaging camera 37 detects the opened and closed statuses of the right eyelid, and the left-eye imaging camera 38 detects the opened and closed statuses of the left eyelid. The imaging setting part 176 performs various kinds of operation of the head-mounted display device 100a based on the combinations of the detected opened and closed statuses of the right eyelid and the left eyelid. Accordingly, in the head-mounted display device 100a in the second embodiment, the user may image the outside scenery SC using the outside scenery imaging camera 61a without using hands, and the convenience of the user is improved.

Furthermore, in the head-mounted display device 100a in the second embodiment, the eye imaging cameras 37, 38 and the image determination part 142 estimate the line-of-sight directions of the user, and the image display unit 20a displays the pointer PO1 showing the estimated line-of-sight directions of the user. The imaging setting part 176 designates a partial area of the outside scenery SC based on the estimated line-of-sight directions and the detection of the eyelids, and allows the image display unit 20a to display the image range outer frame IA showing the designated partial area or the imaged image VI1. Accordingly, in the head-mounted display device 100a in the second embodiment, the user may select a partial area imaged by the outside scenery imaging camera 61a and generate image data of the selected area without using hands, and the usability, the convenience, and the operability of the user are improved.

In addition, in the head-mounted display device 100a in the second embodiment, the focal length of the outside scenery imaging camera 61a is set based on the eyelid statuses detected by the eye imaging cameras 37, 38 and the image determination part 142. The image display unit 20a displays the image range outer frame IA if the focal length is within a range from 35 millimeters to 50 millimeters, and displays an image showing the partial area around the pointer PO1 if the focal length is outside of the range. Accordingly, in the head-mounted display device 100a in the embodiment, the user may set the focal length of the generated image data without using hands, and the convenience of the user is improved. Further, in the case where the set focal length is a focal length for generating image data as outside scenery SC like the visually recognized outside scenery SC, the image display unit 20a shows the partial area for generating the image data by the image range outer frame IA and transmits the outside scenery SC to the user. Furthermore, in the case where the set focal length is a focal length for generating image data as outside scenery SC different from the visually recognized outside scenery SC, the image display unit 20a displays the image showing the image data on the image display unit 20a. Therefore, the image display unit 20a changes the image to display in response to the comparison between the outside scenery SC visually recognized by the user and the outside scenery SC of the image data, and the visibility and the operability of the user are improved.

C. Third Embodiment

The third embodiment is different from the above described embodiments in the method of specifying the line-of-sight direction. When fixating a point of fixation as a specific point, the user does not fixate actually only one point of the point of fixation, but fixates a predetermined range around the point of fixation. As described above, the fine wobbling of eyes that involuntarily and constantly occurs even when a human intends to fixate a point of fixation is called involuntary eye movement. In the third embodiment, in the involuntary eye movement, the line-of-sight directions are specified based on the distances of the eye wobbling from the point of fixation within a predetermined time, the frequency specification of the eye wobbling, or the like.

Figure 21:
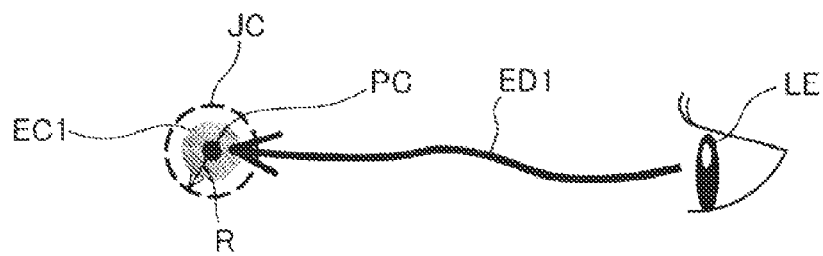
FIG. 21 is an explanatory diagram showing an outline of involuntary eye movement.
Figure 22:
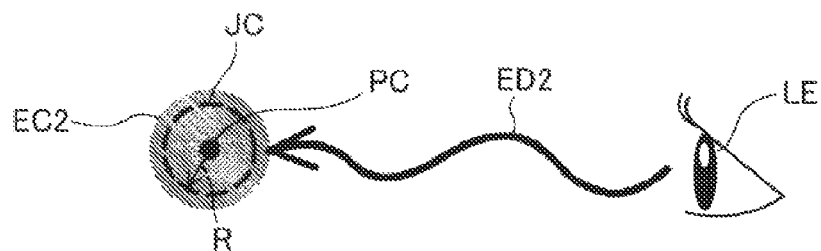
FIG. 22 is an explanatory diagram showing the outline of involuntary eye movement.

In the third embodiment, the image determination part 142 specifies the line-of-sight direction of the user and determines whether or not the user fixates the point of fixation by analyzing the eye wobbling in the involuntary eye movement. FIGS. 21 and 22 are explanatory diagrams showing an outline of the involuntary eye movement. FIG. 21 shows the case where, when the left eye LE of the user fixates a point of fixation PC, a judgment circle JC contains a wobbling range EC1 of wobbling ED1 of the left eye LE of the user (hereinafter, also referred to as "wobbling ED1 in line-of-sight direction"). The judgment circle JC is a circle at a predetermined range R away from the point of fixation PC. FIG. 22 shows the case where the judgment circle JC does not contain a wobbling range EC2 of wobbling ED2 of the left eye LE of the user (hereinafter, also referred to as "wobbling ED2 in line-of-sight direction") different from FIG. 21. Note that the point of fixation PC corresponds to a specific point in the appended claims. Further, the wobbling ED1 and ED2 of the left eye LE corresponds to fluctuations in line-of-sight direction in the appended claims, the judgment circle JC corresponds to a predetermined range in the appended claims, and the range R corresponds to an amplitude of the fluctuations in line-of-sight direction in the appended claims. In the third embodiment, the line-of-sight direction refers to a direction from the user's eye to an arbitrary point in the wobbling range EC1 containing the wobbling ED1.

Figure 23:
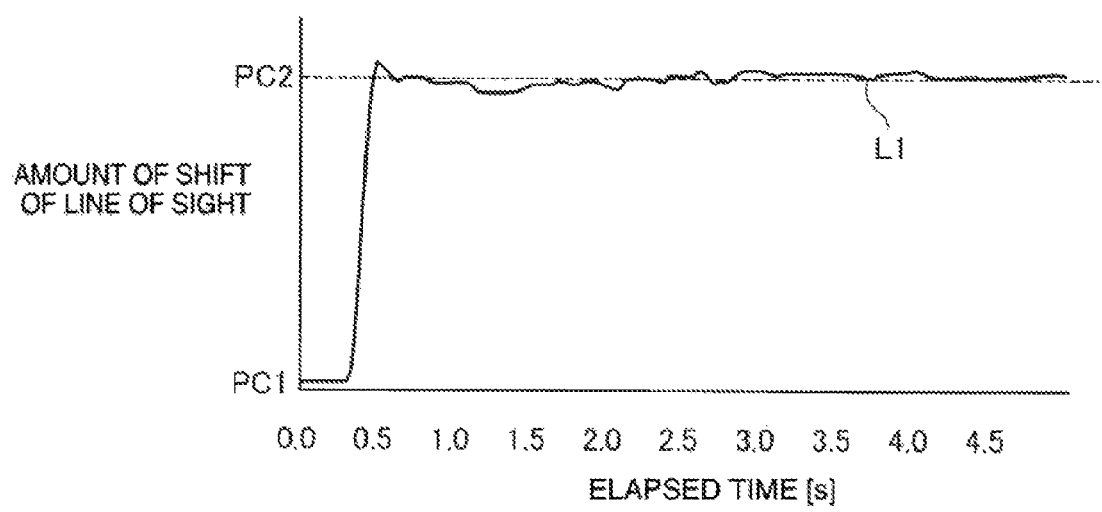
FIG. 23 is an explanatory diagram showing an example of a relationship between elapsed time and amount of shift of the line of sight when the user shifts the line of sight.

Furthermore, the following is known with respect to the time from recognition of the point of fixation PC in the brain to fixation of the point of fixation PC by the user. FIG. 23 is an explanatory diagram showing an example of a relationship between elapsed time and amount of shift of line of sight when the user shifts the line of sight. FIG. 23 shows the amount of shift of line of sight L1 with respect to the elapsed time (s) when the user fixates a point of fixation PC1, and then, shifts the line-of-sight direction to a point of fixation PC2 different from the point of fixation PC1. The elapsed time is measured with the moment when, from a condition in which the point of fixation PC1 is shown by a black point as a point to be fixated, the black point in the position of the point of fixation PC1 is hidden and a black point in a position of the point of fixation PC2 is displayed at the same time as a start time. As shown in FIG. 23, after the black point in the position of the point of fixation PC2 is displayed, the user starts to shift the line of sight after a lapse of about 0.3 seconds (s) and fixates the point of fixation PC2 after a lapse of about 0.4 seconds (s). From the fact, it is known that the user takes a certain amount of time from when recognizing the new point of fixation PC2 in the brain to when starting to shift the line of sight and takes a certain amount of time from when starting to shift the line of sight to when fixating the point of fixation PC2.

Figure 24:
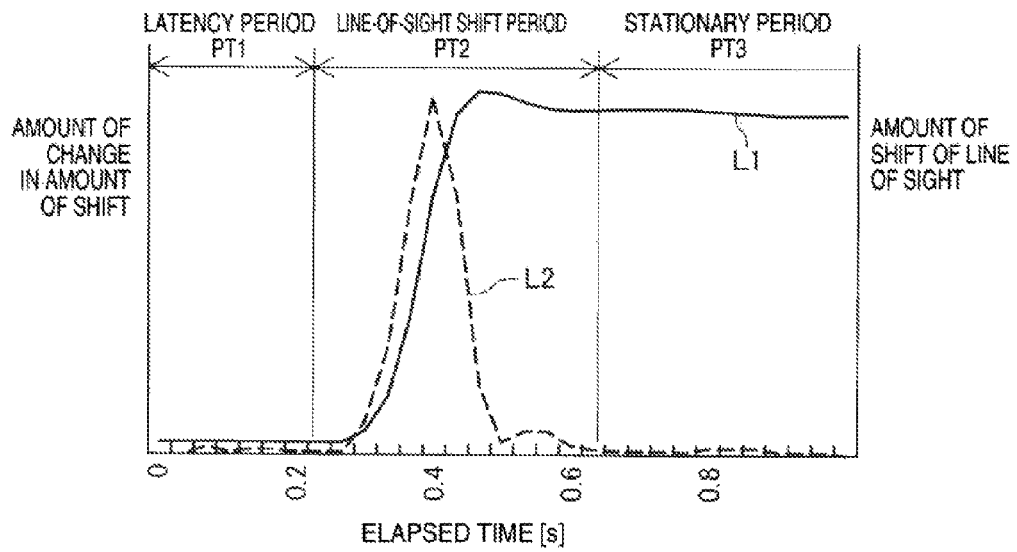
FIG. 24 is an explanatory diagram showing an example of relationships of amount of shift of line of sight and amount of change in amount of shift with respect to elapsed time when the user shifts the line of sight.

FIG. 24 is an explanatory diagram showing an example of relationships of amount of shift of line of sight and amount of change in amount of shift with respect to elapsed time when the user shifts the line of sight. FIG. 24 shows an amount of change in amount of shift of line of sight L2 (hereinafter, also referred to as "amount of change in amount of shift L2" with respect to elapsed time in addition to the amount of shift of line of sight L1 shown in FIG. 23. As shown in FIG. 24, the period after the display of the black point shifts from the point of fixation PC1 to the point of fixation PC2 is divided into a latency period PT1, a line-of-sight shift period PT2, and a stationary period PT3. The latency period PT1 is about 0.3 seconds after the display of the black point shifts from the point of fixation PC1 to the point of fixation PC2. The line-of-sight shift period PT2 is a period after the latency period PT1 ends and before the line of sight no longer shifts, after the latency period PT1 ends from when the display of the black point shifts from the point of fixation PC1 to the point of fixation PC2 to about 0.7 seconds. The stationary period PT3 is a period in which the point of fixation PC2 is fixated and the line of sight of the user does not shift, after the line-of-sight shift period PT2 ends. Accordingly, in the third embodiment, 0.4 seconds (s) of the line-of-sight shift period PT2 is used as a predetermined time used for the determination as to whether or not the user fixates the point of fixation PC, however, the predetermined time may be other than 0.4 seconds in other embodiments.

The image determination part 142 calculates the point of fixation PC at intervals of 0.4 seconds as the predetermined time using the least square method in the eyes RE, LE of the user being continuously imaged. The image determination part 142 determines whether or not the wobbling ranges of the eyes RE, LE of the user in 0.4 seconds fall into the judgment circle JC of the range R predetermined from the calculated point of fixation PC. The image determination part 142 determines that the user is fixating the point of fixation PC if the wobbling ranges of the eyes RE, LE fall into the judgment circle JC, and determines that the user is not fixating the point of fixation PC if the wobbling ranges of the eyes RE, LE do not fall into the judgment circle JC. That is, the image determination part 142 determines that the user is fixating the point of fixation PC if the amplitudes of wobbling of the eyes RE, LE of the user are less than the range R.

Figure 25:
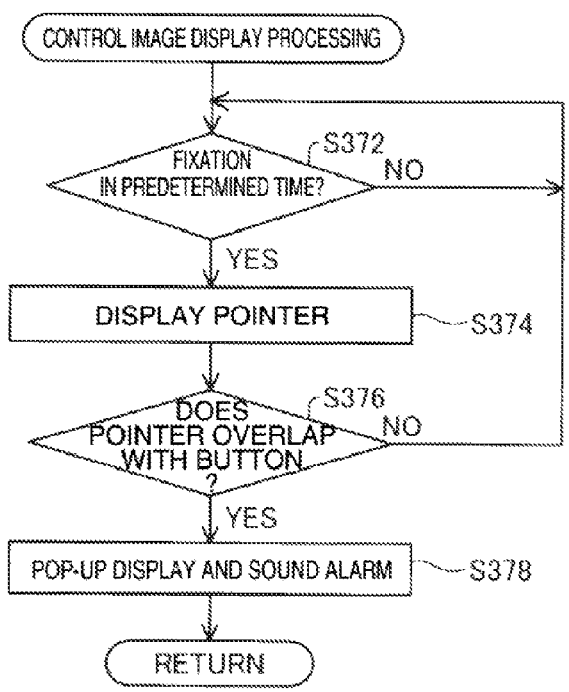
FIG. 25 is an explanatory diagram showing a flow of control image display processing in the third embodiment.

FIG. 25 is an explanatory diagram showing a flow of control image display processing in the third embodiment. The control image display processing corresponds to the processing at step S370 in the line-of-sight operation input processing of the first embodiment. The control image display processing is processing performed after the control image CI (FIG. 7) not containing the pointer P1 is displayed in the maximum image display area PN. First, the image determination part 142 determines whether or not the user fixates the point of fixation PC in a predetermined time (step S372). If having continuously determined that the range EC2 is not contained in the judgment circle JC and the point of fixation PC is not fixated in 0.4 seconds as the predetermined time (step S372: NO), the image determination part 142 continues to monitor fixation of the point of fixation PC by the user (step S372). If the determination that the range EC1 is continuously contained in the judgment circle JC and the point of fixation PC is fixated in 0.4 seconds is made (step S372: YES), the line-of-sight input part 175 allows the image display unit 20 to additionally display the pointer P1 as the control image CI (step S374).

Then, the line-of-sight input part 175 determines whether or not the pointer P1 overlaps with a selectable button (e.g., the search button B1 or the like) in the control image CI (step S376). For example, if the determination that the pointer P1 does not overlap with any button is made (step S376: NO), the image determination part 142 monitors fixation of a new point of fixation PC different from the pointer P1 currently displayed (step S372). In the third embodiment, the pointer P1 is displayed for a fixed time in the maximum image display area PN for visual recognition of the position fixated by the user, however, the pointer P1 may not be displayed at the time when the determination that the pointer P1 does not overlap with any selectable button in the control image CI is made in the other embodiments.

Figure 26:
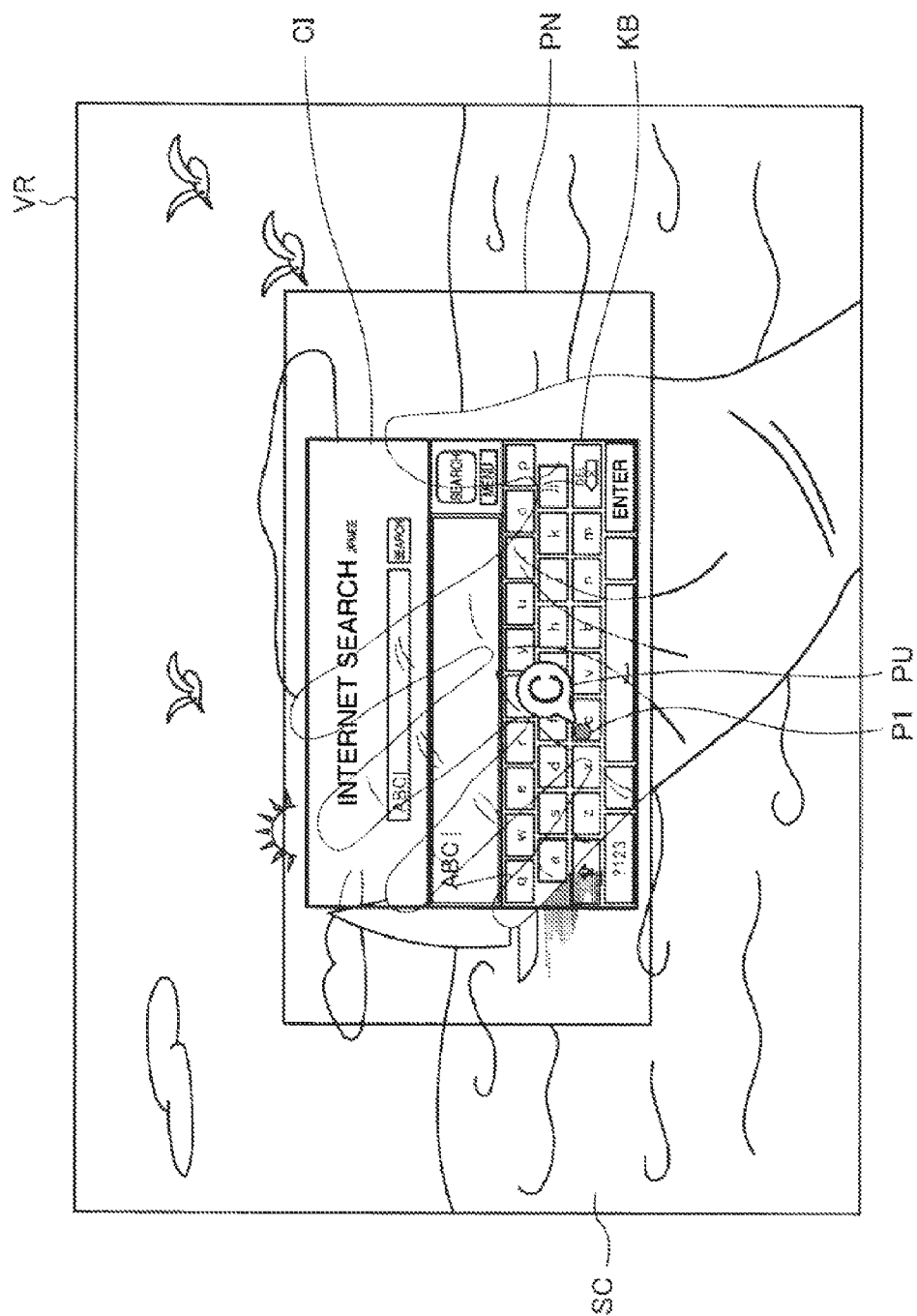
FIG. 26 is an explanatory diagram showing an example of a visual range visually recognized by a user.

In the processing at step S376, if the determination that the pointer P1 overlaps with a selectable button in the control image CI is made (step S376: YES), the image display unit 20 pops up the overlapping selectable button and the sound processing part 170 and the earphones 32, 34 output sound indicating the selectable button. FIG. 26 is an explanatory diagram showing an example of the visual range VR visually recognized by the user. As shown in FIG. 26, the image display unit 20 displays a character of "C" of the alphabet large in the keyboard KB overlapping with the pointer P1 as popup PU. Further, the sound processing part 170 outputs the sound of "C" to the user via the earphones 32, 34.

As described above, in the head-mounted display device 100 in the third embodiment, the image determination part 142 detects eye wobbling with respect to the line-of-sight directions connecting from the eyes RE, LE to the point of fixation PC, and the line-of-sight input part 175 displays the pointer P1 as the control image CI if the wobbling ranges of the eyes RE, LE fall into the judgment circle JC. Accordingly, in the head-mounted display device 100 of the third embodiment, control of the displayed image is performed based on the line-of-sight direction in consideration of the eye wobbling of the user, and the accuracy of the control may be improved.

Further, in the head-mounted display device 100 in the third embodiment, the image determination part 142 determines that the user is fixating the point of fixation PC if the amplitudes of wobbling of the eyes RE, LE of the user are less than the range R as the radius of the judgment circle JC. Furthermore, the image determination part 142 determines that the user is fixating the point of fixation PC if the wobbling ranges of the eyes RE, LE fall into the judgment circle JC.

Accordingly, in the head-mounted display device 100 in the third embodiment, whether or not the user is fixating the point of fixation PC may be simply determined by setting the range R as the radius of the judgment circle JC.

Furthermore, in the head-mounted display device 100 in the third embodiment, if the determination that the user is fixating the point of fixation PC is made, the sound processing part 170 outputs the sound of "C" of the alphabet in the keyboard KB overlapping with the pointer P1 showing the point of fixation PC in the maximum image display area PN to the user via the earphones 32, 34. In the head-mounted display device 100 in the third embodiment, the user may visually recognize that the user can control the displayed image by the sound, and the convenience of the user is improved.

In addition, in the head-mounted display device 100 in the third embodiment, the image display unit 20 displays the control image CI and, if the determination that the user is fixating the point of fixation PC is made, the line-of-sight input part 175 allows the image display unit 20 to display the pointer P1 for setting the keys of the keyboard KB contained in the control image CI or the like to be selectable. Accordingly, in the head-mounted display device 100 in the third embodiment, erroneous operation of selecting a key unless the user fixates the key in the control image CI may be prevented and accurate operation reflecting the intention of the user is performed.

D. Modified Examples:

Note that the invention is not limited to the above described embodiments, but may be implemented in various forms without departing from the scope thereof. The following modifications may be made, for example.

Figure 27:
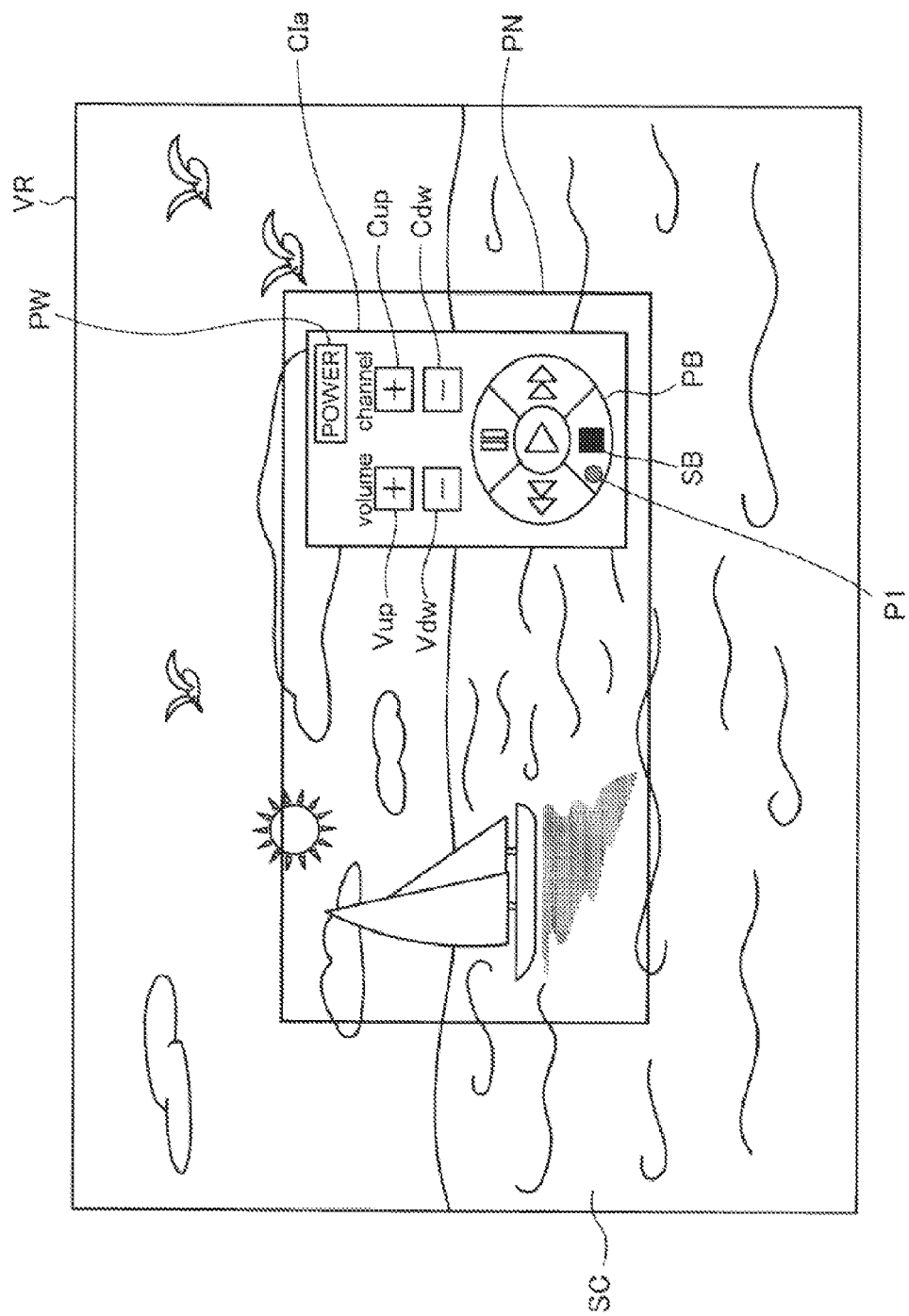
FIG. 27 is an explanatory diagram showing an example of a control image displayed in an image display unit.

D1. Modified Example 1:

FIG. 27 is an explanatory diagram showing an example of a control image CIa displayed in the image display unit 20. FIG. 27 shows a visual range VR containing outside scenery SC visually recognized by the user and the displayed control image CIa. The control image CIa is an image showing an operation unit (remote) of a television connected to the head-mounted display device 100 via the wireless communication part 132. The control image CIa contains a power button PW for switching ON/OFF of the power of the television, volume buttons Vup, Vdw for adjustment of the sound volume of the television, and channel change buttons Cup, Cdw for changing the channel of the television. When the volume button Vup is selected and decided, the volume of the television increases by a predetermined numeric value and, when the volume button Vdw is selected and decided, the volume of the television decreases by a predetermined numeric value. When the channel change button Cup is selected and decided, the television sets the channel number to the larger channel number by the predetermined number and receives wave. When the channel change button Cdw is selected and decided, the television sets the channel number to the smaller channel number by the predetermined number and receives wave. Further, the control image CIa also contains a group PB of DVD operation buttons having a plurality of buttons for operation of a DVD player connected to the television with wire. As shown in FIG. 27, the pointer P1 is displayed in a position overlapping with a stop button SB for stopping the reproduction of the DVD player contained in the group PB of DVD operation buttons. Like the above described embodiments, if the eye imaging cameras 37, 38 detect the eyelid statuses showing the operation of decision, the line-of-sight input part 175 stops the contents reproduced in the DVD player. In the modified example, the adjustment of the devices connected to the head-mounted display device 100 is operated according to the line-of-sight directions and the eyelid statuses of the user.

Figure 28:
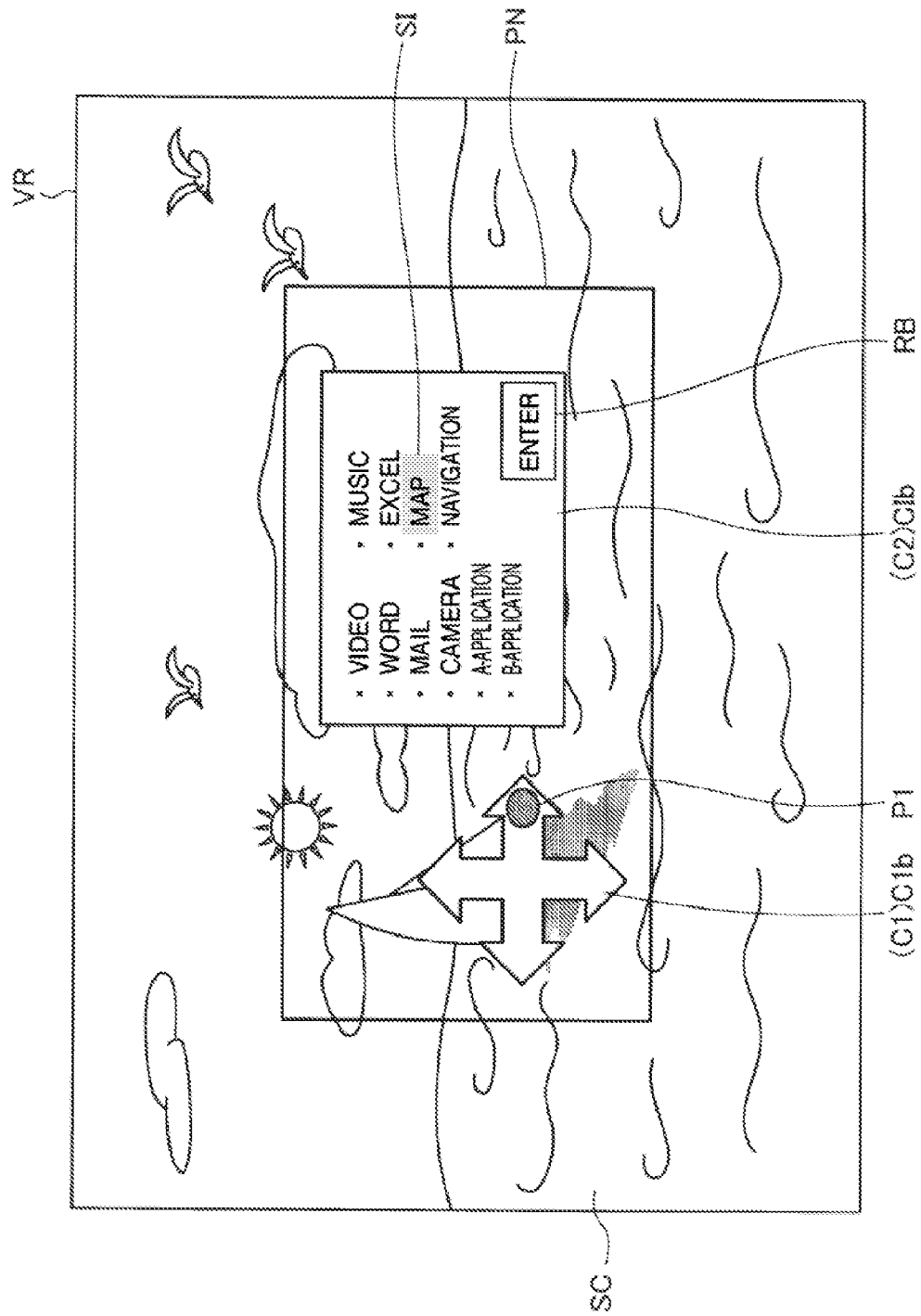
FIG. 28 is an explanatory diagram showing an example of a control image displayed in the image display unit.

FIG. 28 is an explanatory diagram showing an example of a control image CIb displayed in the image display unit 20. FIG. 28 shows a visual range VR containing outside scenery SC visually recognized by the user and the displayed control image CIb. The control image CIb shown in FIG. 28 is an image in which a plurality of icon images represented by characters associated with the contents including moving images and music stored in the memory unit 120 in a list. The control image CIb includes a cursor image C1, a list image C2, and a pointer P1. In the modified example, the cursor image C1 has a cross shape by which up, down, left, right directions are respectively selected. As shown in FIG. 28, in a condition in which the pointer P1 overlaps with a part of the arrow indicating the right of the cross, if the eyelid statuses showing the operation of decision is detected, in the list image C2, a selected display image SI that indicates selection of the map icon image shifts to the next on the right. In the modified example, in the list image C2, there is no other icon image on the right of the map icon image, and accordingly, the selected display image SI loops and shifts to the mail icon image on the left and is superimposed and displayed on the mail icon image. Further, in the modified example, even when the operation of decision is not performed with the pointer P1 on one of the vertical and horizontal directions of the cursor image C1, a specific icon image may be selected and decided with the point P1 on one of the icon images in the list image C2. In a condition in which the specific icon image is superimposed and displayed on the selected display image SI, when the operation of decision is performed with the pointer P1 on an enter key RB, the icon image superimposed and displayed on the selected display image SI is decided and the operation associated with the icon image is performed.

D2. Modified Example 2:

Further, in the above described embodiments, the operation of decision is detected based on the opened and closed statuses of the eyelids, however, the method of detecting the operation of decision is not limited to the opened and closed statuses of the eyelids, but variously modified. Even when the eyelids are opened, various kinds of operation may be performed based on the color and the illuminance of the outside scenery visually recognized by the user. In the modified example, the illuminance sensors 45, 47 detect the illuminance of the outside scenery assumed to be visually recognized by the right eye and the left eye of the user. Accordingly, even when the user does not close the eyelid, for example, when the surface of the left optical image display part 28 is covered by the palm of the user, the outside scenery is no longer visually recognized by the left eye and the left-eye illuminance sensor 47 detects the illuminance having the smaller value than that of the illuminance detected by the right-eye illuminance sensor 45. If the illuminance processing part 145 determines that the illuminance detected by the left-eye illuminance sensor 47 is lower than the illuminance detected by the right-eye illuminance sensor 45 by a predetermined threshold value or more, the line-of-sight input part 175 performs the same operation as that in the status in which the left eyelid is closed in the embodiments. Accordingly, in the head-mounted display device 100 of the modified example, the user may sensuously perform operation using a part of the body such as a palm when tired of the operation by the eyelid statuses, and the convenience of the user is improved.

Further, in the other modified examples, in place of the illuminance sensors 45, 47, RGB color sensors that detect RGB data in the respective line-of-sight directions of the right eye and the left eye may be provided. Various kinds of operation may be performed based on the values detected by the RGB color sensors respectively corresponding to the right eye and the left eye. For example, when the surface of the left optical image display part 28 is covered, the RGB color sensor corresponding to the left eye detects RGB data representing a color close to black. On the other hand, if the RGB data detected by the RGB color sensor corresponding to the right eye does not represent a color close to black, the closed status of the left eyelid of the user may be determined.

D3. Modified Example 3:

Further, in the above described embodiments, the control image CI is displayed in the predetermined position, however, the position in which the control image CI is displayed is not necessary to be fixed to a predetermined position or the like, and the display position of the control image CI and the method of changing the display position may be variously modified. In the head-mounted display device 100 of the modified example, the nine-axis sensor 66 and the direction determination part 161 estimate the orientation of the head of the user and calculate the angle formed by the estimated orientation of the head and the direction of gravitational force. For example, if the user faces upward and the angle calculated by the direction determination part 161 is equal to or more than a predetermined angle, the image display unit 20 displays the control image CI in another part than the upper part in the maximum image display area PN. Accordingly, in the head-mounted display device 100 of the modified example, the user changes the orientation of the head and the change of the object desired to be visually recognized by the user is estimated, the control image CI is automatically displayed in a position not hindering the visual range of the user, and thereby, the convenience of the user is improved.

Furthermore, the position in which the image display unit 20 displays the control image CI may be changed based on the line-of-sight directions of the user, the opened and closed statuses of the eyelids, or the like. For example, when the eye imaging cameras 37, 38 detect the closed status of only the right eye of the user in a predetermined time, and then, detect the closed status of only the left eye within a certain period, the position of the control image CI in the maximum image display area PN may be changed based on the line-of-sight directions of the user. In the head-mounted display device 100 of the modified example, the position in which the control image CI is displayed may be set according to the intension of the user without using hands or the like, and thereby, the operability and the convenience of the user are improved.

In addition, in the above described embodiments, if the palm HD as the set object is detected, the control image CI is displayed in response to the size of the imaged palm HD, however, the relationship between the set object and the control image CI is not limited to that, but may be variously modified. For example, the type of the displayed control image CI may be changed in response to the size and the shape of the imaged palm HD. Further, the display position of the control image CI may be set in another part than the center of the maximum image display area PN based on the positional relationship between the imaged palm HD and the image display unit 20. In the modified example, the user may visually recognize the transmitted outside scenery SC and the control image CI so that they may not overlap in many areas based on the position and the size of the imaged set object, and the convenience of the user is improved.

D4. Modified Example 4:

Further, in the above described embodiments, the object within the predetermined range from the range sensor 63 is detected by the range sensor 63, however, the head-mounted display device 100 is not necessarily include the range sensor 63 and the configuration of the head-mounted display device 100 may be variously modified. For example, the outside scenery imaging camera 61 and the image determination part 142 may determine whether or not the imaged object is the set object by pattern matching regardless of the distance to the object.

Furthermore, in the above described embodiments, the eye imaging cameras 37, 38 and the image determination part 142 determine the opened and closed statuses of the eyelids, however, the method of detecting a shielding object that shields the line-of-sight directions of the user is not limited to that, but may be variously modified. For example, in place of the eye imaging cameras 37, 38, infrared sensors may be used. The infrared sensors determine the opened and closed statuses of the eyelids of the user based on the reflected lights of emitted infrared rays reflected by the eyes or the eyelids of the user. Furthermore, the image determination part 142 may binarize the RGB data of images acquired by the eye imaging cameras 37, 38 into black and white and determine the opened and closed statuses of the eyelids of the user based on the binarized data, not by pattern matching.

Furthermore, the eye imaging cameras 37, 38 may have a stabilizer function. By the stabilizer function, the eye imaging cameras 37, 38 reduce blurring produced by walking during walk of the user, for example, and thereby, the eyelid statuses may be detected and determined more accurately.

In addition, the power consumption of the power source 130 may be suppressed based on the operation part 135 and the detected eyelid statuses. For example, if the track pad 14 in the operation part 135 receives operation from the user, power supply to the eye imaging cameras 37, 38 that detect the eyelid statuses of the user and the illuminance sensors 45, 47 may be stopped. Further, if the head-mounted display device 100 and the devices connected to the head-mounted display device 100 are operated by the line-of-sight directions of the user and the eyelid statuses of the user, power supply to the operation part 135 may be stopped. In the modified example, if the operation from the user is received by one operation part of the operation part 135 and the control image CI, power to the operation part not receiving the operation is stopped, and thereby, the power consumed by the head-mounted display device 100 may be suppressed. Furthermore, in place of the control unit 10, for example, a portable terminal such as a smartphone may be connected and power consumption of the connected portable terminal may be suppressed.

Further, in the above described embodiments, the line-of-sight input part 175 operates the head-mounted display device 100 based on the line-of-sight directions and the eyelid statuses of the user, however, the method of operating the head-mounted display device 100 is not necessarily limited to that, but may be variously modified. For example, the eye imaging cameras 37, 38 and the image determination part 142 may detect only the line-of-sight directions of the user, and one key contained in the control image CI may be selected based on the line-of-sight directions and decided by one button contained in the operation part 135. Further, not the button contained in the operation part 135, but an user interface separately provided, an enter button formed in the image display unit 20, or the like may be used. In the modified example, selection is performed only by the line-of-sight directions, the decision is performed not by the eyelid statuses, but by buttons provided in the operation part 135 or the like, and thus, the user may easily perform decision operation and the convenience and the operability of the user are improved.

Furthermore, in the above described embodiments, the keys corresponding to the letters of the alphabet contained in the keyboard KB, the search button B1, the switch key B2, and the menu switch key B3 are taken as specific examples corresponding to the objects in the appended claims, and the pointer P1 is taken as a specific example corresponding to the pointer in the appended claims, however, the objects and the pointer may variously be modified. For example, the objects or the pointer in the appended claims may have forms modified in shape, color, figure, or the like such as a mark, a sign, a marker, a symbol, a selection button, a soft key, and a soft keyboard.

In addition, in the above described embodiments, the eye imaging cameras 37, 38 detect the opened and closed statuses of the eyelids at predetermined distances from the eye imaging cameras 37, 38 on the line-of-sight directions, however, the cameras do not necessarily detect the shielding objects such as eyelids at the predetermined distances. For example, the shielding objects existing within a certain range to the predetermined distances are detected, and thereby, the same operation as the detection of the opened and closed statuses of the eyelids may be performed.

D5. Modified Example 5:

Further, the outside scenery imaging camera 61 may be provided in the control unit 10 or may be separated from the control unit 10 or the image display unit 20 and provided in an upper part of a hardhat worn by the user.

Furthermore, in the above described embodiments, as shown in FIG. 2, the nine-axis sensor 66, the range sensor 63, the outside scenery imaging camera 61, the eye imaging cameras 37, 38, and the illuminance sensors 45, 47 are provided in the image display unit 20, however, they are not necessarily provided in the image display unit 20, but their arrangement may be variously modified. For example, the eye imaging cameras 37, 38 may be separated from the image display unit 20, and may be worn on the head separately from the image display unit 20, or may be detachably formed from the image display unit 20.

In the above described embodiments, the operation part 135 is formed in the control unit 10, however, the form of the operation part 135 may be variously modified. For example, a user interface as the operation part 135 may be provided separately from the control unit 10. In this case, the operation part 135 is separated from the control unit 10 with the power source 130 etc. formed therein, and the part may be downsized and the convenience of the user is improved. Further, the nine-axis sensor that detects the motion of the operation part 135 may be formed in the operation part 135 and various kinds of operation is performed based on the detected motion, and thereby, the user may sensuously operate the head-mounted display device 100.

For example, the image light generation part may include an organic EL (Organic Electro-Luminescence) display and an organic EL control unit. Further, for example, for the image generation part, in place of the LCD, an LCOS (Liquid crystal on silicon, LCOS is a registered trademark), a digital micromirror device, or the like may be used. Furthermore, for example, the invention may be applied to a laser retina projection-type head-mounted display. In the case of the laser retina projection-type, "an area in which image light can be output in the image light generation part" may be defined as an image area recognized by the user's eye.

Further, for example, the head-mounted display may have a form having an optical image display part that covers only a part of the user's eye, in other words, a form of an optical image display part that does not completely cover the user's eye. Furthermore, the head-mounted display may be the so-called monocular-type head-mounted display.

In addition, ear-fit-type or headband-type earphones may be employed or omitted. Further, the head-mounted display may be formed as a head-mounted display mounted on a vehicle of an automobile, an airplane, or the like, for example. Furthermore, for example, the head-mounted display may be formed as a head-mounted display build in a body protector including a hardhat.

Figure 29:
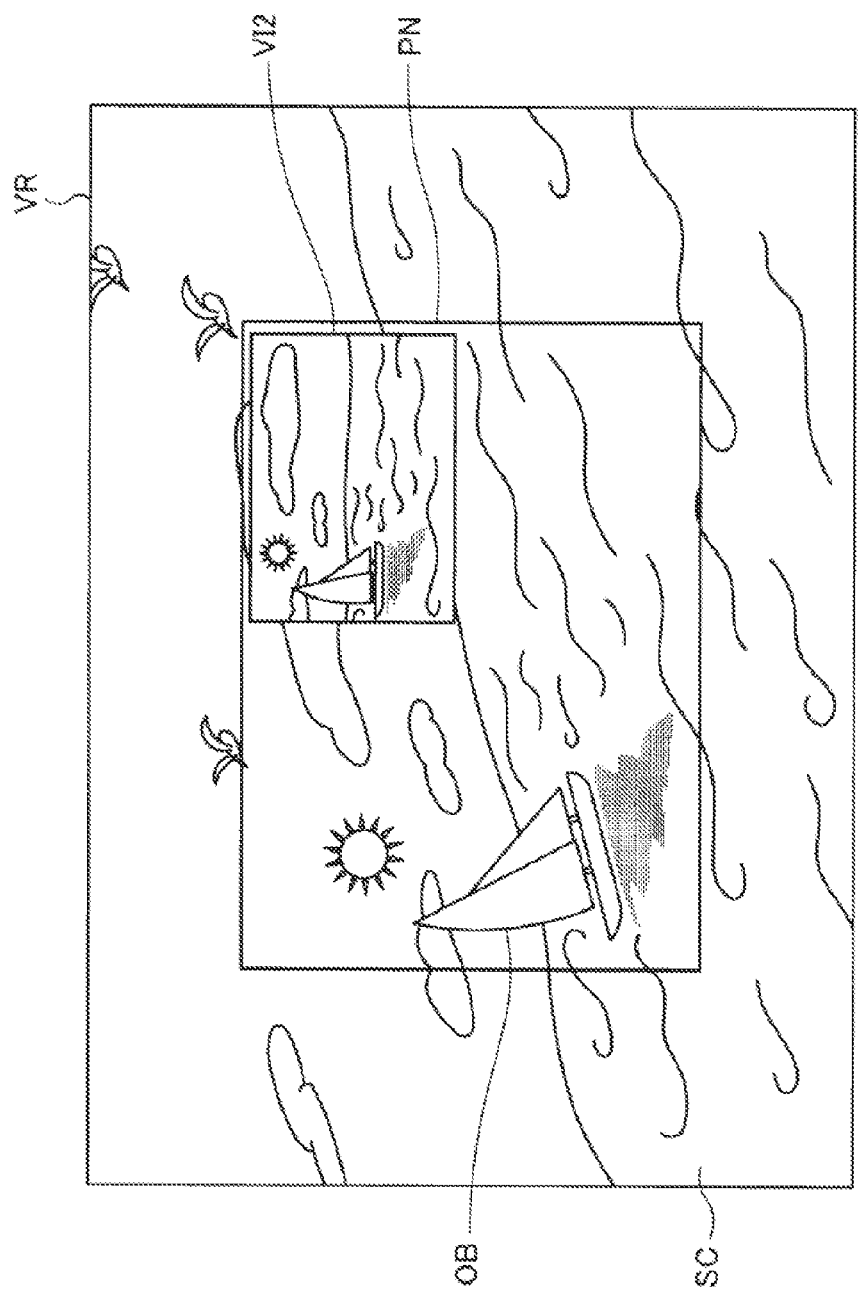
FIG. 29 is an explanatory diagram showing an example of a visual range visually recognized by the user in an imaging adjustment mode.

D6. Modified Example 6:

FIG. 29 is an explanatory diagram showing an example of the visual range VR visually recognized by the user in the imaging adjustment mode. FIG. 29 shows the visual range VR visually recognized by the user in a condition that the user tilts the head to the right, i.e., the orientation of the head of the user tilts with respect to the direction of gravitational force and forms an angle of 90 degrees or less with the horizontal plane. An imaged image VI2 shown in FIG. 29 shows an outside scenery image imaged when the optical axis of the outside scenery imaging camera 61a is an axis in parallel to the horizontal plane orthogonal to the direction of gravitational force. In the modified example, the direction determination part 161 and the nine-axis sensor 66 estimate the orientation of the head of the user, and the direction determination part 161 calculates the angle formed by the estimated orientation of the head and the direction of gravitational force. If the angle calculated by the direction determination part 161 is equal to or more than a predetermined angle, the imaging setting part 176 corrects only the amount of the calculated angle and displays the imaged image VI2 displayed by the image display unit 20a. Note that the angle formed by the direction of gravitational force or the horizontal plane and the orientation of the head of the user is not limited to the example shown in FIG. 29 and may be variously modified. For example, when the condition that the user vertically tilts the head to a predetermined angle or more is detected, the image displayed in the imaged image VI2 may be corrected. Note that the imaged image VI2 is the outside scenery image corrected by the amount of the calculated angle, however, without the angle correction, the outside scenery imaging camera 61a may change the orientation with respect to the image display unit 20a based on the calculated angle and the outside scenery imaging camera 61a may image the outside scenery SC with the axis in parallel to the horizontal plane as the optical axis.

In the head-mounted display device 100a in the modified example, the nine-axis sensor 66 and the direction determination part 161 detect the orientation of the head of the user with respect to the direction of gravitational force, and, if the detected angle formed by the direction of gravitational force and the orientation of the head is equal to or more than the predetermined angle, displays the outside scenery SC imaged by the outside scenery imaging camera 61a with the axis in parallel to the horizontal plane orthogonal to the direction of gravitational force as the optical axis. Accordingly, in the head-mounted display device 100a in the modified example, for example, even when the user temporarily changes the orientation of the head by turning the head, the user may image the outside scenery SC in parallel to the horizontal plane assumed to be desired to be imaged by the user, and the usability of the user is improved.

D7. Modified Example 7:

Further, in the above described embodiments, operation of setting the display mode of the image display unit 20a, setting the partial area in the imaged outside scenery SC, etc. are performed based on the opened and closed statuses of the eyelids detected by the eye imaging cameras 37, 38, however, the operation may be performed based on the detection result of the shielding object that shields the line-of-sight directions of the user other than the opened and closed statuses of the eyelids. For example, even when both eyelids of the user are opened, the operation of the image display unit 20*a* and the outside scenery imaging camera 61*a* may be performed based on the color and the illuminance of the outside scenery SC visually recognized by the user. In the modified example, the illuminance sensors 45, 47 detect the illuminance of the outside scenery SC assumed to be visually recognized by the right eye and the left eye of the user, and the operation is performed based on the numeric values of the detected illuminance. Unless the user closes the eyelids, for example, if the surface of the left optical image display part 28 is covered by the hand of the user, the numeric value of the illuminance detected by the left-eye illuminance sensor 47 is lower than the numeric value of the illuminance detected by the right-eye illuminance sensor 45. In this case, the illuminance processing part 145 makes the same determination as that for the closed status of the left eyelid by the image determination part 142 in the embodiments, and the imaging setting part 176 performs the operation of the image display unit 20*a* and the outside scenery imaging camera 61*a* based on the determination. Further, instead of the opened and closed statuses of the eyelids in the embodiments, the illuminance sensors 45, 47 detect the illuminance in a fixed period and the illuminance processing part 145 compares the difference between the illuminance at the two time points, and thereby, the operation of the image display unit 20*a* and the outside scenery imaging camera 61*a* may be performed.

In the head-mounted display device 100*a* of the modified example, the illuminance sensors 45, 47 detect the illuminance in a predetermined range from the respective right eye and left eye of the user to the parts in which the surfaces of the optical image display parts 26, 28 are covered by the hand, and the imaging setting part 176 performs the operation of the image display unit 20*a* or the like based on the detection results. Accordingly, in the head-mounted display device 100*a* of the modified example, when the user is tired of the operation by changing the eyelid statuses such as winking, the user may sensuously perform the operation like changing of the eyelid statuses using a part of the body such as a palm, and thereby, the convenience of the user is improved.

Further, RGB color sensors respectively provided for the right eye and the left eye may detect RGB data in ranges from the respective right eye and left eye of the user to the surfaces of the optical image display parts 26, 28. The imaging setting part 176 may perform various kinds of operation based on the values detected by the RGB color sensors respectively corresponding to the right eye and the left eye. For example, when the surface of the left optical image display part 28 is covered by the hand of the user, the RGB color sensor corresponding to the left eye detects RGB data representing a color close to black. On the other hand, if the RGB data detected by the RGB color sensor corresponding to the right eye is RGB data that represents white under the clear sky in the day, the status may be determined like a wink with the closed left eye of the user in the embodiment.

Furthermore, in place of the illuminance sensors 45, 47, infrared sensors may be provided. Instead of the opened and closed statuses of the eyelids in the embodiments, the infrared rays emitted from the infrared sensors are reflected by shielding objects that shield the line-of-sight directions, and the reflected lights are detected by receiving parts of the infrared sensors, and thereby, the operation of the image display unit 20*a* and the outside scenery imaging camera 61*a* may be performed. In the modified example, the shielding objects may be detected in a darker place in the night, and the convenience of the user is improved.

Further, in the above described embodiments, the focal length of the optical zoom lens is automatically changed when the right eye of the user is half-closed, however, the method of adjusting the focal length is not limited to that, but may be variously modified. For example, when the surface of the left optical image display part 28 is covered by the hand of the user, the focal length may be set to gradually increase due to the change in illuminance detected by the left-eye illuminance sensor 47. Further, when the surface of the right optical image display part 26 is covered by the hand of the user, the focal length may be set to gradually decrease due to the change in illuminance detected by the right-eye illuminance sensor 45.

Furthermore, in the above described embodiments, the outside scenery imaging camera 61*a* may be formed to be able to change the imaging direction with respect to the image display unit 20*a*, however, the camera may be fixed to the image display unit 20*a* or formed separately from the image display unit 20*a*. Further, the outside scenery imaging camera 61*a* may change the focal length of the optical zoom lens, however, an image in which a part of the imaging range is enlarged may be generated by digital zoom.

D8. Modified Example 8:

Further, in the above described embodiments, a partial area contained in the imaged outside scenery SC is specified when the display mode of the image display unit 20*a* is the imaging area fixing mode, however, the image determination part 142 may recognize a specific object and the recognized specific object may be tracked and imaged by the outside scenery imaging camera 61*a*. In the modified example, when the specific object contained in the imaged outside scenery SC is selected based on the eyelid statuses and the line-of-sight directions, the image determination part 142 recognizes the specific object. The image determination part 142 calculates changes of the specific object in the outside scenery image at a plurality of time points from the outside scenery image imaged in a fixed period, and thereby, specifies the specific object based on the calculated changes. Then, if the specific object is contained in the imaged outside scenery SC, the imaging setting part 176 sets a partial area of the outside scenery SC containing the specific object. The outside scenery imaging camera 61*a* changes the orientation with respect to the image display unit 20*a* and images the set partial area, and the image display unit 20*a* displays the outside scenery SC containing the specific object. Further, for example, if the movement speed of the recognized specific object rapidly increases and the specific object is outside of the imaged outside scenery SC, the imaging setting part 176 estimates the position of the specific object based on the movement change of the specific object when the specific object is contained in the imaged outside scenery SC. The outside scenery imaging camera 61*a* changes the imaging orientation to the estimated position of the specific object and images the object.

In the head-mounted display device 100*a* in the modified example, unless a transmitter or the like is mounted on the specific object, the specific object is image-recognized and the specific object is automatically tracked and imaged, and thereby, the usability and the operability of the user are improved. Further, even when the outside scenery image containing the imaged specific object is different from the visually recognized outside scenery SC, the image is displayed on the image display unit 20*a*, and thereby, it is not necessary for the user to visually recognize the specific object when desiring to image the outside scenery SC containing the specific object and the convenience of the user is improved. Further, even when the specific object is outside of the imaged outside scenery SC, the position of the specific object is automatically estimated and the outside scenery SC containing the specific object is imaged, and the convenience of the user is improved.

D9. Modified Example 9:

Further, in the above described embodiments, the outside scenery imaging camera 61a saves the outside scenery image obtained by imaging the outside scenery SC, however, the imaged image is not limited to a still image at a specific time point, but may be a moving image. The mode of the image display unit 20a may be changed to a mode of imaging an image and a mode of recording a moving image based on the detected opened and closed statuses of the eyelids and the estimated line-of-sight directions of the user.

Furthermore, in the above described embodiments, the focal length of the outside scenery imaging camera 61a is set according to the opened and closed status of the right eye of the user detected by the right-eye imaging camera 37 and the image determination part 142, however, the operation of setting the focal length is not limited to that, but may be variously modified. For example, in the imaging adjustment mode, when a finger of the user touches the track pad 36 provided in the image display unit 20a, the pointer PO1 may be displayed and the focal length may be set based on the motion of the finger of the user. For example, when the user's finger touching the track pad 36 is moved from the right ear to the front of the user, the image display unit 20a may display an outside scenery image in which a partial area around the pointer PO1 is enlarged in the imaged image VI1. Conversely, when the user's finger touching the track pad 36 is moved from the front toward the right ear of the user, the image display unit 20a may display an outside scenery image in which a partial area around the pointer PO1 is reduced in the imaged image VI1.

D10. Modified Example 10:

The involuntary eye movement includes drift, tremor, and flick. The drift is small and smooth movement, the tremor is very small vibration at a high frequency. The flick is small movement like jumping, small saccade. The image determination part 142 may determine whether or not the user fixates the point of fixation PC by analyzing frequency characteristics of at least one of drift, tremor, and flick to specify the range R and the point of fixation PC.

As shown in FIG. 24 in the third embodiment, the user needs at least about 0.7 seconds as a sum of at least the latency period PT1 and the line-of-sight shift period PT2 for shifting the line-of-sight position of fixation from the point of fixation PC1 to the point of fixation PC2. Accordingly, whether or not the user fixates the point of fixation PC may be determined using 0.4 seconds of the line-of-sight shift period PT2, and whether or not the user shifts the point of fixation PC to fixate may be determined using 0.7 seconds. For example, a threshold value may be set to 0.7 seconds for the change from the fixation of the point of fixation PC1 to the fixation of the point of fixation PC2 by the user. In this case, when the position of the point of fixation PC changes within the time equal to or less than 0.7 seconds, the change is judged as not being intended by the user. Note that the threshold value used for determination as to whether or not the user shifts the point of fixation PC to fixate is not limited to 0.7 seconds, but may be one second, for example.

Further, in the third embodiment, as shown in FIG. 26, when the determination that the pointer P1 overlaps with the selectable button in the control image CI is made, the overlapping selectable button is popped up, however, the method of displaying the selectable button and the pointer P1 is not limited to that, but may be variously modified. For example, when a certain button is selected, pop-up may be blinked or enlarged for display. Further, the range in which the determination that the pointer P1 overlaps with the selectable button is made may be displayed with respect to the button near the pointer P1 or the range to be determined may be displayed with respect to all buttons. Furthermore, in the maximum image display area PN, a relation among the judgment circle JC, the point of fixation PC, and the range EC1 as shown in FIGS. 21 and 22 may be displayed. By the display, the user may visually recognize the degree as to whether or not the user fixates the point of fixation PC according to the relation between the judgment circle JC and the range EC1, and the convenience of the user is improved. In addition, the calculated point of fixation PC is visually recognized by the user, and thereby, the user may suppress unintended selection of buttons and erroneous operation by the user may be reduced.

Further, in the head-mounted display device 100 of the third embodiment, the user may operate the operation part 135 or the like, and thereby, the number of seconds of the line-of-sight shift period PT2 and the range R in the judgment circle JC may be arbitrarily set. In the head-mounted display device 100 of the modified example, the user may arbitrarily change settings with respect to the specification of the line-of-sight directions, and the convenience of the user is further improved.

Furthermore, the optimum pattern may be selected from the number of seconds of the line-of-sight shift period PT2 and the range R in the judgment circle JC classified in a plurality of patterns in response to the individual difference of age and sex of the user, the brightness of the environment in which the user uses the head-mounted display device 100, or the like. These patterns may be set according to the operation of the operation part 135 or the like and various kinds of operation based on the line-of-sight directions of the user. Furthermore, the setting mode in which these patterns are set, the normal display mode, or the like may be changed according to the time in which the point of fixation PC is fixated by the user or blinking of the eyes of the user. In addition, when the head-mounted display device 100 is connected to a personal computer (PC), tracking of a mouse attached to the PC may be set according to the various kinds of operation based on the line-of-sight directions of the user and the rate of change of the line-of-sight directions.

Further, in the third embodiment, when the determination that the pointer P1 overlaps with the selectable button in the control image CI is made, the overlapping selectable button is popped up and sound indicating the selectable button is output, however, both the pop-up display and the sound output are not necessarily performed. For example, only the pop-up display or only the sound output may be performed. Further, regarding the sound output, the sound is not necessarily output to both the right earphone 32 and the left earphone 34, but may be output to only one of them. Furthermore, the pop-up display and the output sound may be variously modified. For example, pop-up may be displayed and voice "you can input" may be output in the sound.

Furthermore, when predetermined processing is decided by opening and closing of the eyelids and when the determination that the user fixates the point of fixation PC is made, notification may be given to the user by sound output, or at least a partial area in the point of fixation PC or the maximum image display area PN may blink. Further, in place of sound output and blinking, the image display unit 20 and the control unit 10 may vibrate to notify the user or the pointer P1 may be fixed in a predetermined time to notify the user.

D11. Modified Example 11:

The configurations of the head-mounted display device 100 in the embodiments are just examples and may be variously modified. For example, one of the arrow key 16 and the track pad 14 provided in the control unit 10 may be omitted or another operation interface such as an operation stick may be provided in addition to the arrow key 16 and the track pad 14 or in place of the arrow key 16 and the track pad 14. Further, the control unit 10 may have a configuration to which an input device such as a keyboard or mouse can be connected and receive input from the keyboard or the mouse.

Furthermore, as the image display unit, in place of the image display unit 20 worn like spectacles, an image display unit of another system such as an image display unit worn like a hat may be employed, for example. Further, the earphones 32, 34 and the outside scenery imaging camera 61 may be appropriately omitted. Furthermore, in the above described embodiments, as the configuration of generating image light, the LCD and the light source are used, however, in place of them, another display device such as an organic EL display may be employed. In addition, in the above described embodiments, the nine-axis sensor 66 is used as a sensor that detects the motion of the head of the user, however, in place of the sensor, a sensor including one or two of an acceleration sensor, an angular velocity sensor, and a geomagnetic sensor may be used. Further, in the above described embodiments, the head-mounted display device 100 is the optically transmissive type for both eyes, however, the invention may be similarly applied to the other types of head-mounted display device such as the video-transmissive type or the monocular type.

Figure 30A:
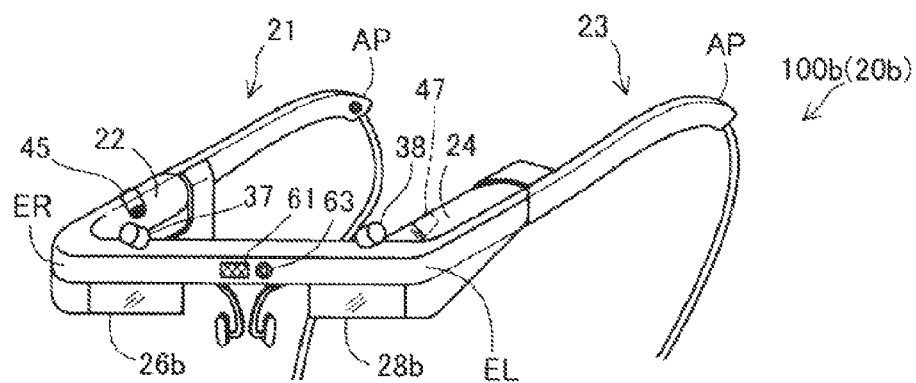
FIGS. 30A and 30B are explanatory diagrams showing outer configurations of head-mounted display devices in modified examples.
Figure 30B:
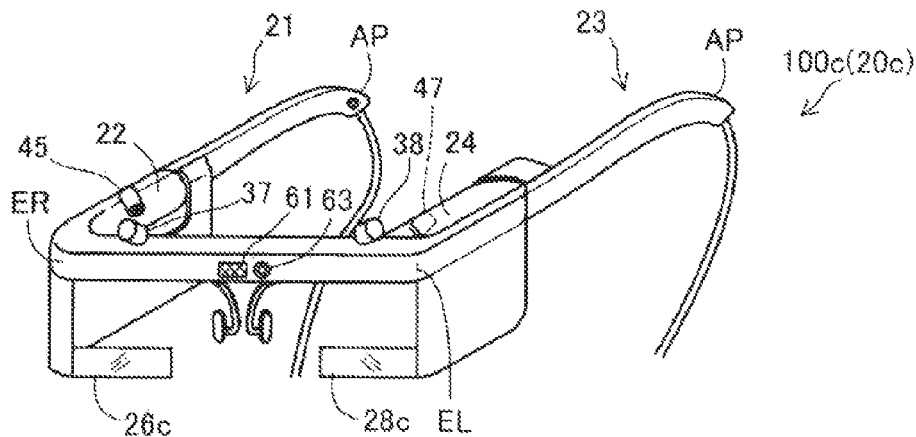

FIGS. 30A and 30B are explanatory diagrams showing outer configurations of head-mounted display devices in modified examples. In the case of the example of FIG. 30A, the difference from the head-mounted display device 100 shown in FIG. 1 is that an image display unit 20*b* includes a right optical image display part 26*b* in place of the right optical image display part 26 and a left optical image display part 28*b* in place of the left optical image display part 28. The right optical image display part 26*b* is formed to be smaller than the optical members of the above described embodiments, and provided in the obliquely upper part of the right eye of the user when the head-mounted display device 100*b* is worn. Similarly, the left optical image display part 28*b* is formed to be smaller than the optical members of the above described embodiments, and provided in the obliquely upper part of the left eye of the user when the head-mounted display device 100*b* is worn. In the case of the example of FIG. 30B, the difference from the head-mounted display device 100 shown in FIG. 1 is that an image display unit 20*c* includes a right optical image display part 26*c* in place of the right optical image display part 26 and a left optical image display part 28*c* in place of the left optical image display part 28. The right optical image display part 26*c* is formed to be smaller than the optical members of the above described embodiments, and provided in the obliquely lower part of the right eye of the user when the head-mounted display is worn. The left optical image display part 28*c* is formed to be smaller than the optical members of the above described embodiments, and provided in the obliquely lower part of the left eye of the user when the head-mounted display is worn. As described above, it is only necessary that the optical image display unit is provided near the eye of the user. Further, the sizes of the optical members forming the optical image display unit may be arbitrary, and a head-mounted display device 100 in which the optical image display unit covers only apart of the user's eye, in other words, the optical image display unit does not completely cover the user's eye may be realized.

Further, in the above described embodiments, the head-mounted display device 100 may guide image lights representing the same image to the left and right eyes of the user and allows the user to visually recognize a two-dimensional image, or may guide image lights representing different images to the left and right eyes of the user and allows the user to visually recognize a three-dimensional image.

Furthermore, in the above described embodiments, a part of the configuration realized by hardware may be replaced by software, or, conversely, a part of the configuration realized by software may be replaced by hardware. For example, in the above described embodiments, the image processing part 160 and the sound processing part 170 may be realized by the CPU 140 reading out and executing computer programs, however, these functional units may be realized by a hardware circuit.

In addition, in the case where part or all of the functions of the invention are implemented by software, the software (computer programs) may be stored and provided in computer-readable media. In the invention, "computer-readable media" include not only portable recording media such as a flexible disk or a CD-ROM but also internal memory devices within the computer such as various RAMs and ROMs and external memory devices fixed to the computer such as a hard disk.

Further, in the above described embodiments, as shown in FIGS. 1 and 2, the control unit 10 and the image display unit 20 are formed as separate configurations, however, the configurations of the control unit 10 and the image display unit 20 are not limited to those, but may be variously modified. For example, all or part of the configurations formed in the control unit 10 may be formed inside of the image display unit 20. Further, the power source 130 in the embodiments may be singly formed and replaceable, or the configuration formed in the control unit 10 may be redundantly formed in the image display unit 20. For example, the CPU 140 shown in FIG. 2 may be formed in both of the control unit 10 and the image display unit 20, or the functions performed by the CPU 140 formed in the control unit 10 and the CPU formed in the image display unit 20 may be individually separated.

In addition, the control unit 10 may be built in a personal computer (PC) and the image display unit 20 may be used in place of the monitor of the PC, or a wearable computer attached to cloths of the user in which the control unit 10 and the image display unit 20 are integrated may be employed.

The invention is not limited to the above described embodiments and modified examples, but may be realized in various configurations without departing from the scope thereof. For example, the technical features in the embodiments and the modified examples corresponding to the technical features in the respective forms described in "SUMMARY" may be appropriately replaced or combined in order to solve part or all of the above described problems or achieve part or all of the above described advantages. Further, the technical features may be appropriately deleted if they are not described as essential features in the specification.

The entire disclosure of Japanese Patent Application Nos. 2013-063599, filed Mar. 26, 2013 and 2013-061466, filed Mar. 25, 2013 and 2013-225386, filed Oct. 30, 2013 are expressly incorporated by reference herein.

What is claimed is:

1. A transmissive head-mounted display device comprising:
   an image display unit that generates image light representing an image, allows a user to visually recognize the image light, and transmits outside scenery when worn on a head of a user;
   a detection unit that detects at least one of a line-of-sight direction of the user and a shielding object that is located at a predetermined distance from an eye of the user and shields a line of sight of the user; and a control unit that performs control of the image light based on the detected detection result, wherein the image display unit allows the user to visually recognize a plurality of selectable objects and a pointer indicating a position corresponding to the detected line-of-sight direction as the image light, the control unit performs control on the head-mounted display device in response to a positional relationship between the plurality of selectable objects and the pointer, the detection unit detects the shielding object in the line-of-sight direction, the control unit performs, as the control, selection of one of the selectable objects based on the positional relationship, and performs determination of the selected object based on the detection result of the shielding object, the detection unit detects a right eye front index value and a left eye front index value indicating at least one of colors and illuminance in a range from the respective right eye and left eye of the user to the predetermined distance, and the control unit performs control in response to the positional relationship and the detected right eye front index value and left eye front index value.

2. The head-mounted display device according to claim 1, wherein the detection unit detects an eyelid status of the user as the shielding object, and the control unit performs control in response to the detected eyelid status and the positional relationship.

3. The head-mounted display device according to claim 1, wherein the image display unit sets an area around the detected line-of-sight direction and images the outside scenery within the area based on the detection result of the shielding object.

4. The head-mounted display device according to claim 1, further comprising:

an imaging unit that images the outside scenery; and an image recognition unit that recognizes a specific object contained in the imaged outside scenery and existing in a position farther than the predetermined distance, wherein the image display unit sets an area around the recognized specific object and images the outside scenery within the area based on the recognized specific object.

5. The head-mounted display device according to claim 1, further comprising an orientation detection unit that detects an orientation of the head of the user, wherein the image display unit sets an area around a line-of-sight based on the detected orientation of the head of the user and images the outside scenery within the area based on the detected orientation of the head.

6. The head-mounted display device according to claim 1, further comprising an imaging unit that images the outside scenery, wherein the control unit performs operation of the imaging unit based on the detection result of the shielding object as the control, and the image display unit generates area image light as image light representing outside scenery within an imaging area.

7. The head-mounted display device according to claim 6, further comprising an image recognition unit that recognizes a specific object contained in the imaged outside scenery based on the operation, wherein, when the specific object is recognized in the imaged outside scenery, the control unit sets a partial area of the imaged outside scenery based on the specific object, and the outside scenery image light is image light representing the set partial area.

8. The head-mounted display device according to claim 7, wherein, when the specific object is not recognized in the imaged outside scenery, the control unit estimates a direction from the imaging unit to the specific object based on change in position of the specific object when the specific object is recognized in the imaged outside scenery, and the imaging unit images the estimated direction.

9. The head-mounted display device according to claim 6, further comprising an orientation detection unit that detects an orientation of the head of the user with respect to the direction of gravity force, wherein, when an angle formed by the detected orientation of the head and the direction of gravity force is equal to or more than a predetermined value, the image display unit generates the area image light as image light representing at least a partial area of outside scenery imaged with an axis in parallel to the horizontal plane orthogonal to the direction of gravity force as an optical axis based on the angle.

10. The head-mounted display device according to claim 1, wherein the image display unit generates line-of-sight position image light as image light representing a position corresponding to the line-of-sight direction with respect to the imaged outside scenery and allows the user to visually recognize the line-of-sight position image light, the control unit sets a partial area of the imaged outside scenery based on the detected line-of-sight direction and the combination, and the area image light is image light representing the set partial area.

11. The head-mounted display device according to claim 10, wherein the operation includes adjustment of a focal length of a lens of the imaging unit, and regarding the area image light, when the focal length is within the predetermined distance, the area image light is generated in a peripheral part in the partial area, and, when the focal length is beyond the predetermined distance, outside scenery image light representing an outside scenery image in the partial area is generated as the area image light.

12. The head-mounted display device according to claim 1, wherein the detection unit detects fluctuations in line of sight when the user fixates a specific point, and the control unit performs the control based on the fluctuations in line of sight.

13. The head-mounted display device according to claim 12, wherein, when an amplitude of the fluctuations in line of sight is less than a threshold value, the control unit determines that the user fixates the specific point.

14. The head-mounted display device according to claim 13, wherein when determining that the user fixates the specific point, the control unit sets the object to be selectable.

15. The head-mounted display device according to claim 12, wherein, when the line-of-sight direction falls within a predetermined range around the specific point in a predetermined period, the control unit determines that the user fixates the specific point.

16. The head-mounted display device according to claim 15, wherein the image display unit allows a user to visually recognize image light representing the predetermined range as the image light.

17. The head-mounted display device according to claim 15, further comprising a sound output unit,
   wherein, when the line-of-sight direction falls within the predetermined range in the predetermined period, the control unit allows the sound output unit to output specific sound.

18. The head-mounted display device according to claim 1, wherein the detection unit detects a palm of the user as the shielding object.

19. The head-mounted display device according to claim 1, wherein, when a second eyelid combination is detected the control unit changes the image display unit to a second display mode for specifying a partial area of the outside scenery to be captured.

20. The head-mounted display device according to claim 1, wherein the detection unit detects a half-closed status of a right eyelid and a half-closed status of a left eyelid of the user.

21. The head-mounted display device according to claim 2, wherein the detection unit detects an opened and closed status of a right eyelid and an opened and closed status of a left eyelid of the user, and
   the control unit performs control in response to the positional relationship and the detected combination of the opened and closed status of the right eyelid and the opened and closed status of the left eyelid.

22. A method of controlling a transmissive head-mounted display device, the device including an image display unit that generates image light representing an image, allows a user to visually recognize the image light, and transmits outside scenery when worn on a head of a user, and a detection unit that detects at least one of a line-of-sight direction of the user and a shielding object that is located at a predetermined distance from an eye of the user and shields a line of sight of the user, the method comprising performing control of the image light based on the detected detection result,
   wherein
      the image display unit allows the user to visually recognize a plurality of selectable objects and a pointer indicating a position corresponding to the detected line-of-sight direction as the image light,
      the control unit performs control on the head-mounted display device in response to a positional relationship between the plurality of selectable objects and the pointer,
      the detection unit detects the shielding object in the line-of-sight direction,
      the control unit performs, as the control, selection of one of the selectable objects based on the positional relationship, and performs determination of the selected object based on the detection result of the shielding object,
      the detection unit detects a right eye front index value and a left eye front index value indicating at least one of colors and illuminance in a range from the respective right eye and left eye of the user to the predetermined distance, and
      the control unit performs control in response to the positional relationship and the detected right eye front index value and left eye front index value.

* * * * *